United States Patent
Paluri et al.

(10) Patent No.: US 12,267,501 B2
(45) Date of Patent: *Apr. 1, 2025

(54) SLICE TYPE-BASED IMAGE/VIDEO CODING METHOD AND APPARATUS

(71) Applicant: LG ELECTRONICS INC., Seoul (KR)

(72) Inventors: Seethal Paluri, Seoul (KR); Hendry Hendry, Seoul (KR); Seunghwan Kim, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,772

(22) Filed: Oct. 11, 2023

(65) Prior Publication Data

US 2024/0064305 A1 Feb. 22, 2024

Related U.S. Application Data

(63) Continuation of application No. 17/737,806, filed on May 5, 2022, now Pat. No. 11,825,096, which is a
(Continued)

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/159* (2014.11); *H04N 19/174* (2014.11); *H04N 19/70* (2014.11)

(58) Field of Classification Search
CPC ............................. H04N 19/70; H04N 19/159
See application file for complete search history.

(56) References Cited

U.S. PATENT DOCUMENTS

| 10,375,416 B1 | 8/2019 | Wenger et al. |
| 2015/0092846 A1* | 4/2015 | Lu .......................... H04N 19/50 375/240.12 |

(Continued)

FOREIGN PATENT DOCUMENTS

| CN | 105379266 A | 3/2016 |
| CN | 107431806 A | 12/2017 |

(Continued)

OTHER PUBLICATIONS

Xiaozhong Xu, et al., "AHG 9: Picture header syntax cleanups", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q0428-v3.

*Primary Examiner* — Fabio S Lima
(74) *Attorney, Agent, or Firm* — Bryan Cave Leighton Paisner LLP

(57) ABSTRACT

A video decoding method performed by a video decoding apparatus, according to the present document, comprises the steps of: obtaining image information from a bitstream, wherein the image information includes a picture header associated with a current picture, and the current picture includes a plurality of slices; parsing at least one of a first flag and a second flag from the picture header; generating prediction samples by performing at least one of intra prediction and inter prediction on a current block in the current picture on the basis of at least one of the first flag and the second flag; generating reconstructed samples on the basis of the prediction samples; and generating a reconstructed picture on the basis of the reconstructed samples.

3 Claims, 13 Drawing Sheets

Related U.S. Application Data continuation of application No. PCT/KR2020/015400, filed on Nov. 5, 2020.

(60) Provisional application No. 62/931,145, filed on Nov. 5, 2019.

(51) Int. Cl.
*H04N 19/174* (2014.01)
*H04N 19/70* (2014.01)

(56) References Cited

U.S. PATENT DOCUMENTS

| | | | | |
|---|---|---|---|---|
| 2021/0092460 | A1* | 3/2021 | Chen | H04N 19/124 |
| 2021/0112253 | A1* | 4/2021 | Xu | H04N 19/119 |
| 2021/0136419 | A1* | 5/2021 | Hsiang | H04N 19/174 |
| 2021/0368192 | A1* | 11/2021 | Hu | H04N 19/463 |
| 2022/0210440 | A1* | 6/2022 | Xu | H04N 19/172 |
| 2022/0256197 | A1* | 8/2022 | Zhang | H04N 19/176 |
| 2022/0272349 | A1* | 8/2022 | Paluri | H04N 19/107 |
| 2023/0046994 | A1* | 2/2023 | Zhang | H04N 19/176 |
| 2023/0065112 | A1* | 3/2023 | Laroche | H04N 19/184 |

FOREIGN PATENT DOCUMENTS

| | | |
|---|---|---|
| KR | 10-2021-0118941 A | 10/2021 |
| WO | 2012033327 A2 | 3/2012 |
| WO | 2016/196043 A1 | 12/2016 |

\* cited by examiner

SLICE TYPE-BASED IMAGE/VIDEO CODING METHOD AND APPARATUS

This application is a continuation application of U.S. patent application Ser. No. 17/737,806, filed on May 5, 2022, which is a continuation of International Application No. PCT/KR2020/015400, filed on Nov. 5, 2020, which claims the benefit of U.S. Provisional Application No. 62/931,145, filed on Nov. 5, 2019, the contents of which are all hereby incorporated by reference herein in their entirety.

BACKGROUND OF DISCLOSURE

Field of the Disclosure

The present technology relates to a method and apparatus for coding image/video based on information about a slice type.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

This document is to provide a method and apparatus for improving mage/video coding efficiency.

This document is also to provide a method and apparatus for efficiently performing inter prediction and/or intra prediction in video/video coding.

This document is also to provide a method and apparatus for efficiently signaling slice type related information in transmitting image/video information.

This document is also to provide a method and apparatus for omitting signaling unnecessary for inter prediction and/or intra prediction in transmitting image/video information.

According to an embodiment of this document, a video decoding method performed by a video decoding apparatus is provided, the method including: obtaining image information from a bitstream, wherein the image information includes a picture header associated with a current picture, and the current picture includes a plurality of slices; parsing at least one of a first flag or a second flag from the picture header; generating prediction samples by performing at least one of intra prediction or inter prediction on a current block in the current picture based on at least one of the first flag or the second flag; generating reconstructed samples based on the prediction samples; and generating a reconstructed picture based on the reconstructed samples, wherein the first flag indicates whether information necessary for an inter prediction operation is present in the picture header, and wherein the second flag indicates whether information necessary for an inter prediction operation is present in the picture header.

According to another embodiment of this document, a video encoding method performed by a video encoding apparatus is provided, the method including: determining a prediction mode of a current block in a current picture, wherein the current picture includes a plurality of slices; generating prediction samples based on the prediction mode; generating reconstructed samples for the current block based on the prediction samples; generating at least one of first information or second information based on the prediction mode; and encoding image information including at least one of the first information or the second information, wherein the first information and the second information are included in a picture header associated with the current picture, wherein the first information indicates whether information necessary for an inter prediction operation is present in the picture header, and wherein the second information indicates whether information necessary for an inter prediction operation is present in the picture header.

According to still another embodiment of this document, there is provided a computer-readable digital storage medium containing information which causes a decoding apparatus to perform a video decoding method, the decoding method including: obtaining image information, wherein the image information includes a picture header associated with a current picture, and the current picture includes a plurality of slices; parsing at least one of a first flag or a second flag from the picture header; generating prediction samples by performing at least one of intra prediction or inter prediction on a current block in the current picture based on at least one of the first flag or the second flag; generating reconstructed samples based on the prediction samples; and generating a reconstructed picture based on the reconstructed samples, wherein the first flag indicates whether information necessary for an inter prediction operation is present in the picture header, and wherein the second flag indicates whether information necessary for an inter prediction operation is present in the picture header.

According to an embodiment of the present document, it is possible to improve overall image/video compression efficiency.

According to an embodiment of this document, inter prediction and/or intra prediction may be efficiently performed when coding an image/video.

According to an embodiment of this document, when transmitting image/video information, information related to a slice type can be efficiently signaled.

According to an embodiment of this document, when transmitting image/video information, signaling of syntax elements unnecessary for inter prediction or intra prediction can be prevented.

DESCRIPTION OF EMBODIMENTS

Figure 1:
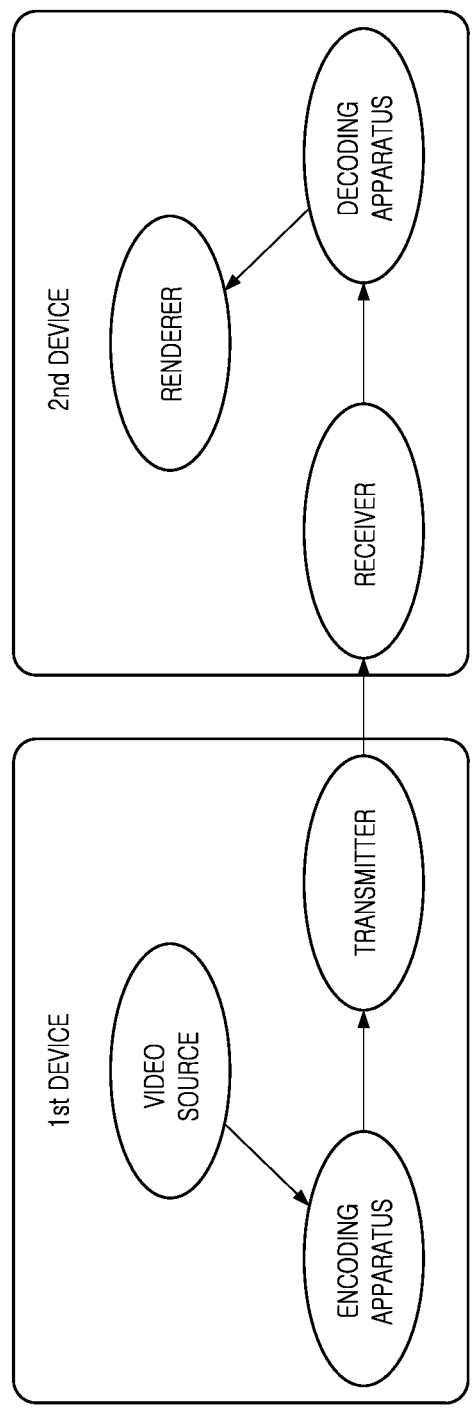
FIG. 1 schematically shows an example of a video/image coding system to which embodiments of the present disclosure may be applied.

This document relates to video/image coding. For example, a method/embodiment disclosed in this document may be applied to a method disclosed in a versatile video coding (VVC) standard. In addition, the method/embodiment disclosed in this document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in this document, and the embodiments may be combined with each other unless otherwise stated.

The disclosure of the present document may be modified in various forms, and specific embodiments thereof will be described and illustrated in the drawings. The terms used in the present disclosure are used to merely describe specific embodiments, but are not intended to limit the disclosed method in the present disclosure. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C".

"Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

Hereinafter, embodiments of the present disclosure will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present disclosure may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. In this document, tile group and slice may be used interchangeably. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

Figure 2:
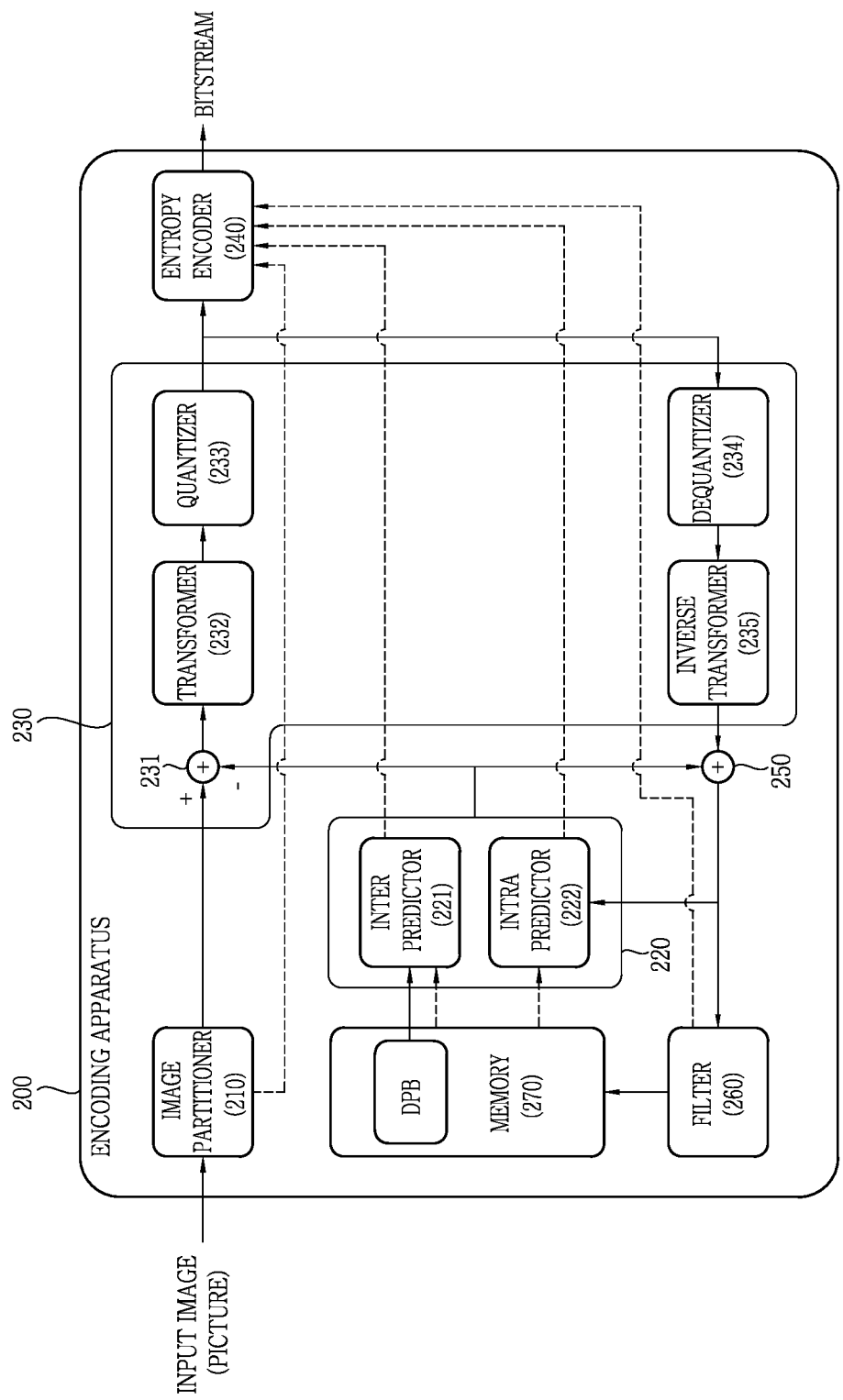
FIG. 2 is a diagram schematically illustrating a configuration of a video/image encoding apparatus to which embodiments of the present disclosure may be applied.

FIG. 2 is a diagram schematically illustrating the configuration of a video/image encoding apparatus to which the embodiments of the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive rvaiable length coding (CAVLC), and context-adaptive binary arithmetic coding (CABAC). The entropy encoder 240 may encode information necessary for video/ image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In this document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
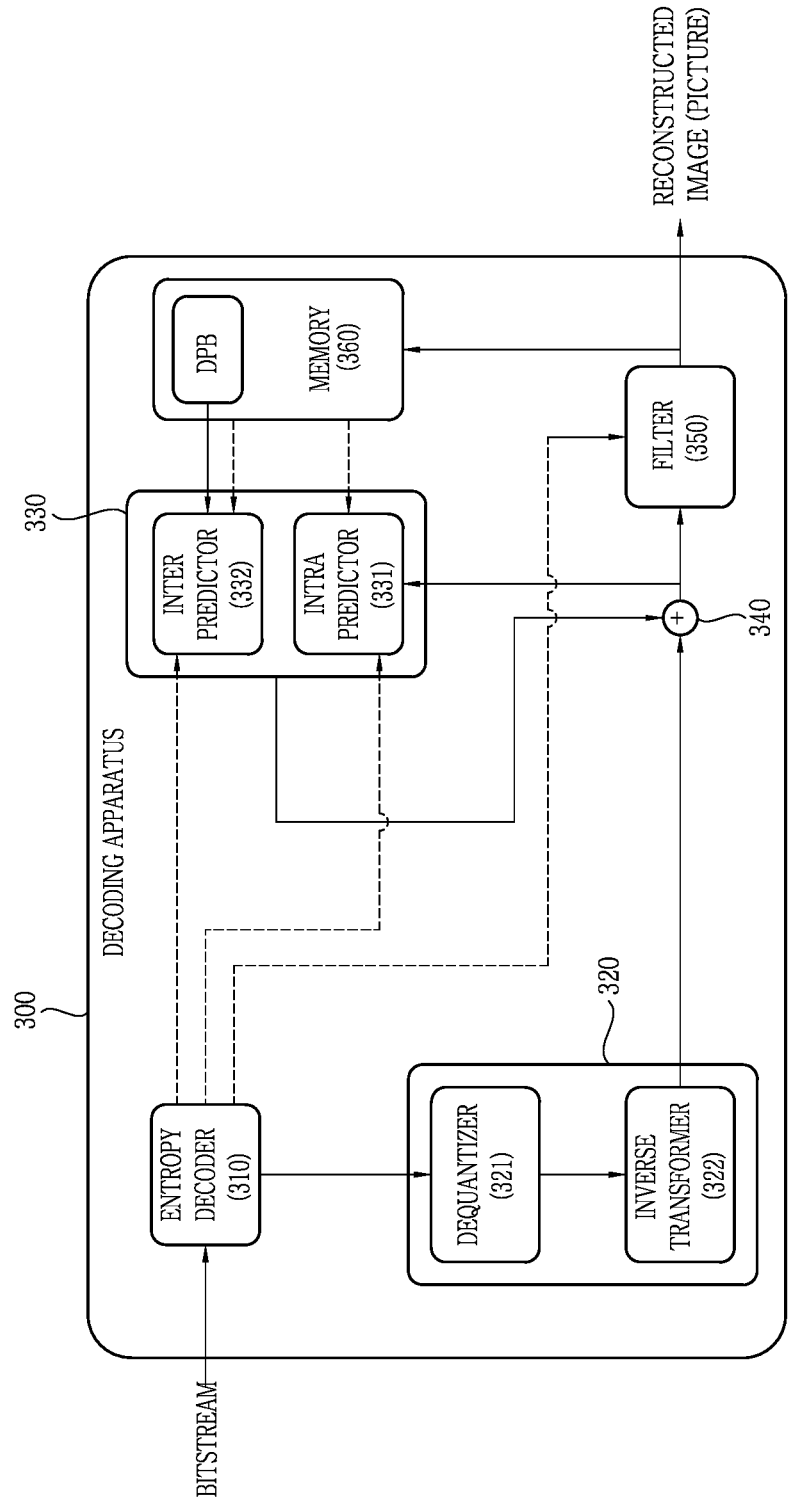
FIG. 3 is a diagram schematically illustrating a configuration of a video/image decoding apparatus to which embodiments of the present disclosure may be applied.

FIG. 3 is a diagram for schematically explaining the configuration of a video/image decoding apparatus to which the embodiments of the present disclosure may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to this document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in this document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or prediction sample array) output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

The method of coding a video/image according to this document may be performed based on such partitioning structures as follows. Such processes as prediction, residual processing ((inverse) transform, (de)quantization, or the like), syntax element coding, filtering or the like to be specifically described later may be performed based on CTU, CU (and/or TU, PU) derived based on the partitioning structure. The block partitioning process may be performed at the above-described image partitioner 210 of the encoding apparatus, and partitioning-related information is (encoding) processed at the entropy encoder 240, and delivered to the decoding apparatus in the form of a bitstream. The entropy decoder 310 of the decoding apparatus may derive the block partitioning structure of the current picture based on the partitioning-related information which has been obtained from the bitstream, and may perform a series of procedures for decoding an image (e.g., prediction, residual process, block/picture reconstruction, in-loop filtering or the like). The CU size and the TU size may be the same, or a plurality of TUs may exist in the CU region. Meanwhile, the CU size may generally indicate a luma component (sample) CB (coding block) size. The TU size may generally indicate a luma component (sample) TB (transform block) size. The chroma component (sample) CB or TB size may be derived based on the luma component (sample) CB or TB size depending on a component ratio according to a color format (Chroma format, e.g., 4:4:4, 4:2:2, 4:2:0, etc.) of the picture/image. The TU size may be derived based on maxTbSize. For example, when the CU size is greater than the maxTbSize, a plurality of TUs (TBs) of the maxTbSize may be derived from the CU, and transform/inverse transform may be performed in units of the TUs (TBs). In addition, for example, when intra prediction is applied, the intra prediction mode/type may be derived in units of the CUs (or CBs), and the neighboring reference sample derivation and prediction sample generation process may be performed in units of TUs (or TBs). In this case, one or a plurality of TUs (or TBs) may be present in one CU (or CB) region, and in this case, the plurality of TUs (or TBs) may share the same intra prediction mode/type.

Also, in video/image coding according to this document, an image processing unit may have a hierarchical structure. One picture may be partitioned into one or more tiles, bricks, slices, and/or tile groups. One slice may include one or more bricks. One brick may include one or more CTU rows in a tile. A slice may include an integer number of bricks of a picture. One tile group may include one or more tiles. One tile may include one or more CTUs. The CTU may be divided into one or more CUs. A tile is a rectangular area that contains CTUs within a particular tile row and a particular tile column in a picture (A rectangular region of CTUs within a particular tile column and a particular tile row in a picture). The tile group may include an integer number of tiles according to the tile raster scan in the picture. The slice header may carry information/parameters applicable to the corresponding slice (blocks in the slice). When the encoding/decoding apparatus has a multi-core processor, the encoding/decoding process for the tile, slice, brick and/or tile group may be processed in parallel. 있다 . In this document, slice or tile group may be used interchangeably. That is, the tile group header may be referred to as a slice header. Here, a slice may have one of the slice types including intra (I) slice, predictive (P) slice, and bi-predictive (B) slice. For blocks in an I slice, inter prediction is not used for prediction, and only intra prediction may be used. Of course, even in this case, the original sample value may be coded and signaled without prediction. For blocks in a P slice, intra prediction or inter prediction may be used, and when inter prediction is used, only uni-prediction may be used. Meanwhile, intra prediction or inter prediction may be used for blocks in B slice, and when inter prediction is used, up to the maximum bi-prediction may be used.

The encoder may determine the sizes of a tile/tile group, brick, slice, and maximum and minimum coding unit according to the characteristics (e.g., resolution) of the video image, or considering the efficiency or parallel processing of coding, and information about this or information that can induce it may be included in the bitstream.

The decoder may obtain information indicating whether the tile/tile group, brick, slice, or CTU in the tile of the current picture is divided into a plurality of coding units. If such information is obtained (transmitted) only under specific conditions, efficiency can be increased.

Figure 4:
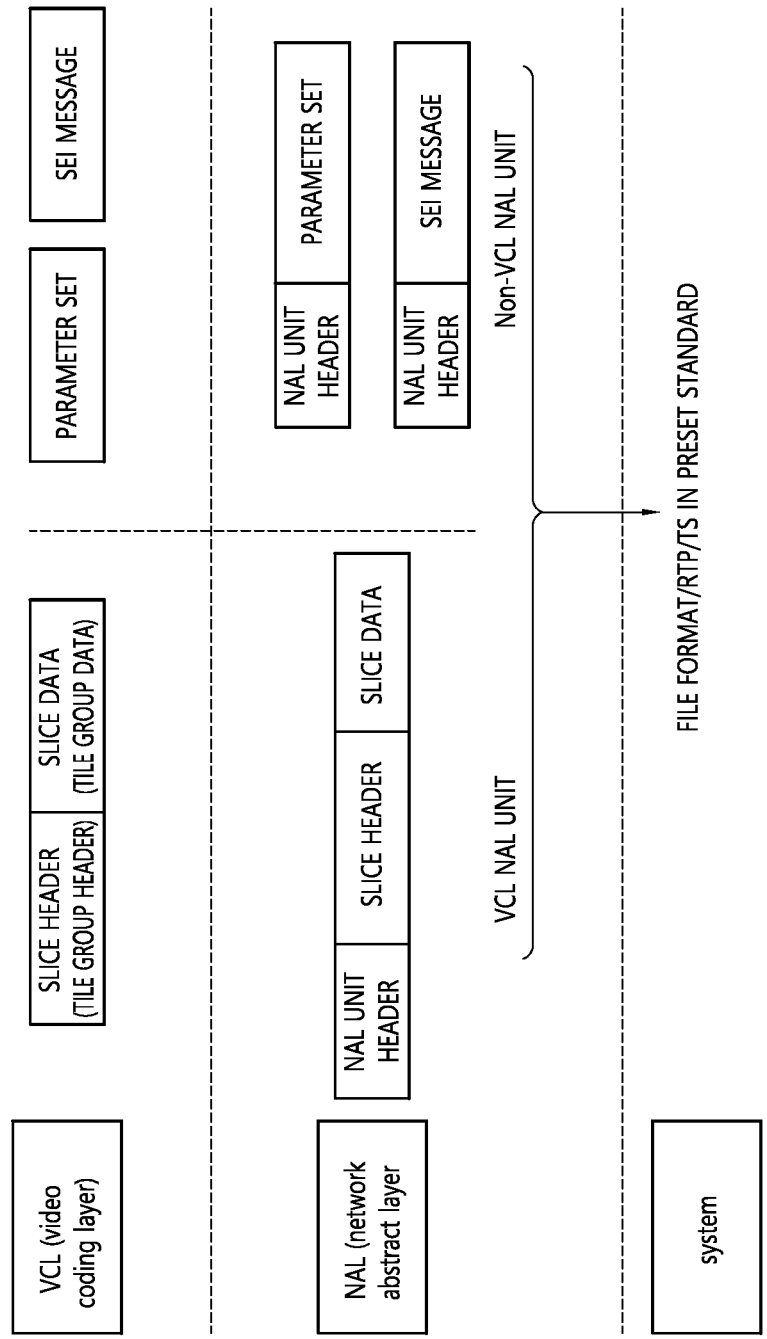
FIG. 4 exemplarily represents a hierarchical structure for a coded image/video.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RB SP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax or slice header information) may include information/parameters commonly applicable to the slice. The APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS).

In this document, high level syntax (HLS) may include at least one of the APS syntax, PPS syntax, SPS syntax, VPS syntax, DPS syntax, picture header syntax, or slice header syntax.

Also, for example, information on the division and configuration of the tile/tile group/brick/slice may be configured at the encoding stage through the upper-level syntax and transmitted to the decoding apparatus in the form of a bitstream.

Herein, image/video information, which is encoded and signaled in the form of a bitstream from the encoding apparatus to the decoding apparatus, may include not only intra-picture partitioning-related information, intra/inter prediction information, residual information, in-loop filtering information, etc., but also include information included in the slice header, information included in the picture header, information included in the APS, information included in the PPS, information included in the SPS, information included in the VPS, and/or information included in the DPS. In addition, the image/video information may further include information of a NAL unit header.

In this document, at least one of quantization/dequantization and/or transform/inverse transform may be skipped. When the quantization/inverse quantization is omitted, the quantized transform coefficient may be referred to as a transform coefficient. When the transform/inverse transform is skipped, the transform coefficient may be referred to as a coefficient or a residual coefficient, or may still be referred to as the transform coefficient for consistency of expression.

In this document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of this document as well.

As described above, the encoding apparatus may perform various encoding methods such as, for example, exponential Golomb, context-adaptive variable length coding (CAVLC), context-adaptive binary arithmetic coding (CABAC), and the like. Additionally, the decoding apparatus may decode information in the bitstream based on a coding method such as exponential Golomb encoding, CAVLC, CABAC, or the like, and may output a value of a syntax element necessary for image reconstruction and quantized values of a transform coefficient regarding a residual. For example, the above-described coding methods may be performed as described below.

In this document, intra prediction may indicate prediction that generates prediction samples for a current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include a sample adjacent to the left boundary of the current block of size nWxnH and a total of 2×nH samples neighboring to the bottom-left, and a sample adjacent to the top boundary of the current block and a total of 2×nW samples neighboring to the top-right and one sample neighboring to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nWxnH, a total of nW samples adjacent to the bottom boundary of the current block, and one sample neighboring to the bottom-right of the current block.

However, some of the neighboring reference samples of the current block have not yet been decoded, or may not be available. In this case, the decoding apparatus may construct neighboring reference samples to be used for prediction by substituting unavailable samples with available samples. Alternatively, neighboring reference samples to be used for prediction may be constructed through interpolation of available samples.

In a case where neighboring reference samples have been derived, (i) the prediction sample may be derived based on the average or interpolation of neighboring reference samples of the current block, and (ii) the prediction sample may be derived based on a reference sample existing in a specific (prediction) direction with regard to a prediction sample among the neighboring reference samples of the current block. The case (i) may be called a non-directional mode or a non-angular mode, and the case (ii) may be called a directional mode or an angular mode. In addition, the prediction sample may be generated through interpolation between the first neighboring sample and the second neighboring sample among the neighboring reference samples, which are located in a direction opposite to the prediction direction of the intra prediction mode of the current block, based on the prediction sample of the current block. The above-described case may be called linear interpolation intra prediction (LIP). Further, chroma prediction samples may be generated based on luma samples using a linear model. This case may be called an LM mode. Further, a temporary prediction sample of the current block may be derived based on the filtered neighboring reference samples, and a prediction sample of the current block may be derived by weighted summing at least one reference sample among the existing neighboring reference samples, that is, non-filtered neighboring reference samples, which is derived according to the intra prediction mode, and the temporary prediction sample. The above-described case may be called position dependent intra prediction (PDPC). In addition, a prediction sample may be derived by selecting a reference sample line of the highest prediction accuracy among the neighboring multi-reference sample lines of the current block, and using a reference sample located in the prediction direction in the line, and at this time, intra prediction encoding may be performed by indicating (signaling) the used reference sample line to the decoding apparatus. The above-described case may be referred to as multi-reference line (MRL) intra prediction or MRL-based intra prediction. Additionally, the current block is divided into vertical or horizontal sub-partitions to perform intra prediction based on the same intra prediction mode, but neighboring reference samples may be derived and used in units of the sub-partitions. That is, in this case, the intra prediction mode for the current block is equally applied to the sub-partitions, and the intra prediction performance may be improved in some cases by deriving and using the neighboring reference samples in units of the sub-partitions. This prediction method may be referred to as intra sub-partitions (ISP) or ISP-based intra prediction. The above-described intra prediction methods may be called an intra prediction type to be distinguished from the intra prediction mode. The intra prediction type may be referred to by various terms such as an intra prediction technique or an additional intra prediction mode. For example, the intra prediction type (or additional intra prediction mode, etc.) may include at least one of the above-described LIP, PDPC, MRL, and ISP. A general intra prediction method excluding a specific intra prediction type such as the LIP, PDPC, MRL, and ISP may be referred to as a normal intra prediction type. The normal intra prediction type may be generally applied when the above-described specific intra prediction type is not applied, and prediction may be performed based on the above-described intra prediction mode. Meanwhile, post-processing filtering may be performed on the derived prediction samples as needed.

Specifically, the intra prediction procedure may include an intra prediction mode/type determination step, a neighboring reference sample derivation step, and an intra prediction mode/type based prediction sample derivation step. In addition, a post-filtering step may be performed on the derived prediction sample as needed.

Meanwhile, in addition to the aforementioned intra prediction types, affine linear weighted intra prediction (ALWIP) may be used. The ALWIP may be referred to as linear weighted intra prediction (LWIP) or matrix weighted intra prediction or matrix based intra prediction (MIP). When the MIP is applied to the current block, i) using surrounding reference samples on which the averaging procedure has been performed, ii) a matrix-vector-multiplication procedure is performed, and iii) a horizontal/vertical interpolation procedure may be further performed to derive prediction samples for the current block as needed. The intra prediction modes used for the MIP may be constructed differently from the intra prediction modes used in the above-described LIP, PDPC, MRL, and ISP intra prediction or normal intra prediction. The intra prediction mode for the MIP may be referred to as a MIP intra prediction mode, a MIP prediction mode, or a MIP mode. For example, a matrix and an offset used in the matrix vector multiplication may be set differently according to the intra prediction mode for the MIP. Here, the matrix may be referred to as a (MIP) weight matrix, and the offset may be referred to as a (MIP) offset vector or a (MIP) bias vector.

In image/video coding, a picture constituting an image/video may be encoded/decoded according to a decoding order. A picture order, which corresponds to an output order of decoded pictures, may be set differently from the decoding order, based on which backward prediction as well as forward prediction may also be performed in the inter prediction.

Figure 5:
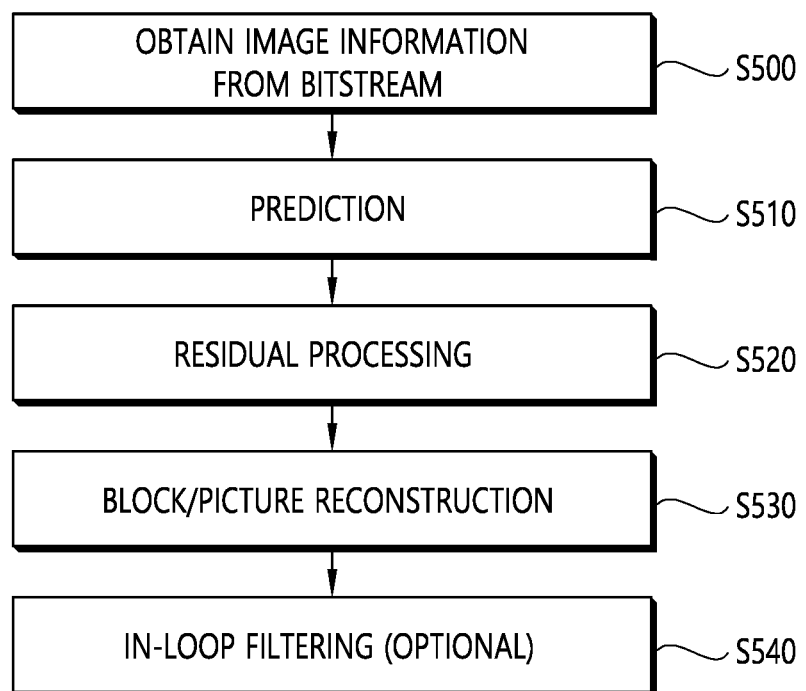
FIG. 5 represents an example of a picture decoding process.

FIG. 5 represents an example of a picture decoding process.

FIG. 5 shows an example of a schematic picture decoding process to which embodiment(s) of this document can be applied. In FIG. 5, S500 may be performed in the entropy decoder 310 of the decoding apparatus described above in FIG. 3; S510 may be performed in the predictor 330; S520 may be performed in the residual processor 320; S530 may be performed in the adder 340; and S540 may be performed in the filter 350. S500 may include the information decoding process described in the present document; S510 may include the inter/intra prediction process described in the present document; S520 may include the residual processing process described in the present document; S530 may include the block/picture reconstruction process described in the present document; and S540 may include the in-loop filtering process described in the present document.

Referring to FIG. 5, as represented in the description with regard to FIG. 3, the picture decoding process may schematically include an image/video information obtaining process S500 from a bitstream (through decoding), a picture reconstruction process S510 to S530, and an in-loop filtering process S540 for the reconstructed picture. The picture reconstruction process may be performed based on the residual samples and the prediction samples obtained through the inter/intra prediction S510 and the residual processing S520 (dequantization for the quantized transform coefficient, inverse transform) process described in the present document. Through the in-loop filtering process for the reconstructed picture which has been generated though the picture reconstruction process, a modified reconstructed picture may be generated, which may be output as a decoded picture, and may also be stored in the decoding picture buffer or a memory 360 of the decoding apparatus and be used as a reference picture in the inter prediction process of the later picture decoding. According to circumstances, the in-loop filtering process may be skipped, and in this case, the reconstructed picture may be output as a decoded picture, and may also be stored in the decoding picture buffer or a memory 360 of the decoding apparatus and be used as a reference picture in the inter prediction process of the later picture decoding. The in-loop filtering process S540 may include the deblocking filtering process, the sample adaptive offset (SAO) process, the adaptive loop filter (ALF) process, and/or the bi-lateral filter process as described above, and all or some of them may be skipped. Further, one or some of the deblocking filtering process, the sample adaptive offset (SAO) process, the adaptive loop filter (ALF) process, and the bi-lateral filter processes may be sequentially applied, or all of them may be sequentially applied. For example, after the deblocking filtering process is applied to the reconstructed picture, the SAO process may be performed thereon. Alternatively, for example, after the deblocking filtering process is applied to the reconstructed picture, the ALF process may be performed thereon. This may be likewise performed in the encoding apparatus.

Figure 6:
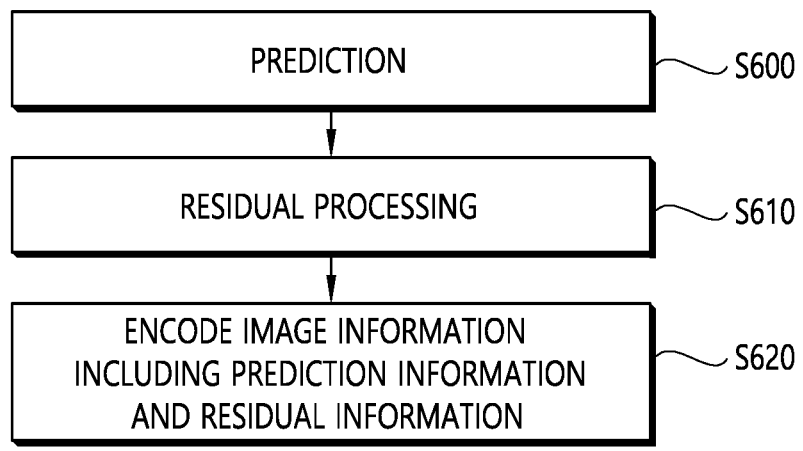
FIG. 6 represents an example of a picture encoding process.

FIG. 6 represents an example of a picture encoding process.

FIG. 6 shows an example of a schematic picture encoding process to which embodiment(s) of this document can be applied. In FIG. 6, S600 may be performed in the predictor 220 of the encoding apparatus described above in FIG. 2; S610 may be performed in the residual processor 230; and S620 may be performed in the entropy encoder 240. S600 may include the inter/intra prediction process described in the present document; S610 may include the residual processing process described in the present document; and S620 may include the information encoding process described in the present document.

Referring to FIG. 6, the picture encoding process may schematically include, as represented in the description with regard to FIG. 2, a process of generating a reconstructed picture for a current picture and a process (optional) of applying in-loop filtering to the reconstructed picture, as well as a process of encoding information for picture reconstruction (e.g., prediction information, residual information, partitioning information or the like) and outputting it in the form of a bitstream. The encoding apparatus may derive (modified) residual samples from a quantized transform coefficient through the dequantizer 234 and the inverse transformer 235, and may generate a reconstructed picture based on the (modified) residual samples and the prediction samples, which are the outputs of S600. The reconstructed picture generated in this way may be the same as the above-described reconstructed picture generated in the decoding apparatus. Through the in-loop filtering process for the reconstructed picture, the modified reconstructed picture may be generated, which may be stored in the decoding picture buffer or a memory 270, and used as a reference picture in the inter prediction process of the later picture encoding, similarly to the case of the decoding apparatus. As described above, all or a part of the in-loop filtering process may be skipped according to circumstances. In a case where the in-loop filtering process is performed, (in-loop) filtering-related information (parameter) may be encoded in the entropy encoder 240 and output in the form of a bitstream, and the decoding apparatus may perform the in-loop filtering process in the same way as that of the encoding apparatus based on the filtering-related information.

Through this in-loop filtering process, it is possible to reduce noises, such as blocking artifact and ringing artifact, which are generated during the image/video coding, and to increase subjective/objective visual quality. Further, as the in-loop filtering process is performed in both the encoding apparatus and the decoding apparatus, the encoding apparatus and the decoding apparatus can derive the same prediction result, increase the reliability of the picture coding, and reduce the amount of data to be transmitted for picture coding.

As described above, the picture reconstruction procedure may be performed in the encoding apparatus as well as in the decoding apparatus. Based on intra prediction/inter prediction on each block unit, a reconstructed block may be generated, and a reconstructed picture including the reconstructed blocks may be generated. In a case where a current picture/slice/tile group is an I picture/slice/tile group, the blocks included in the current picture/slice/tile group may be reconstructed only based on the intra prediction. Meanwhile, in a case where a current picture/slice/tile group is a P or B picture/slice/tile group, the blocks included in the current picture/slice/tile group may be reconstructed based on the intra prediction or inter prediction. In this case, the inter prediction may be applied to some of the blocks in the current picture/slice/tile group, and the intra prediction may be applied to some of the rest of the blocks. A colour component of the picture may include a luma component and a chroma component, and the methods and embodiments proposed in this document may be applied to the luma component and the chroma component unless explicitly limited by this document.

Meanwhile, the video/image encoding procedure based on inter prediction may schematically include, for example, the following.

Figure 7:
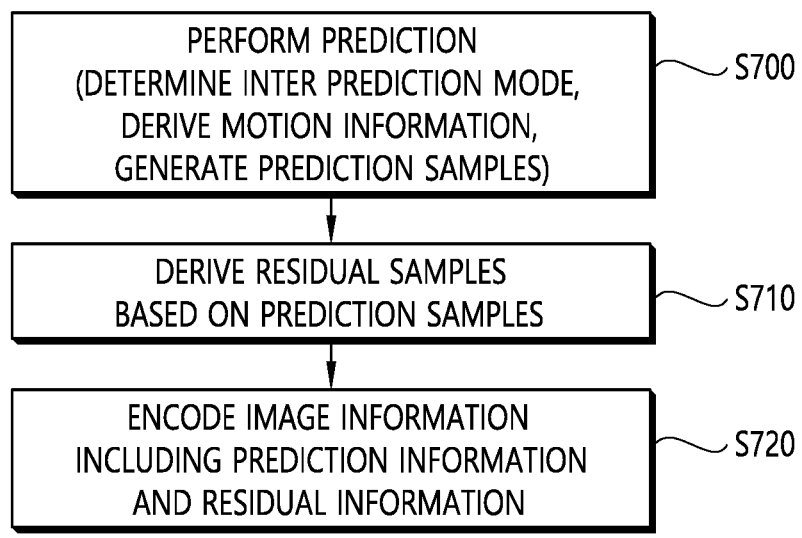
FIG. 7 represents an example of an inter prediction based video/image encoding method.

FIG. 7 represents an example of an inter prediction based video/image encoding method.

Referring to FIG. 7, the encoding apparatus performs inter prediction on the current block (S700). The encoding apparatus may derive inter prediction mode and motion information of the current block, and generate prediction samples of the current block. Here, inter prediction mode determination, motion information derivation, and prediction sample generation processes may be performed at the same time, or performed one after another. For example, the inter predictor of the encoding apparatus may include a prediction mode determiner, a motion information deriver, and a prediction sample deriver. The prediction mode determiner may determine a prediction mode for the current block, the motion information deriver may derive motion information of the current block, and the prediction sample deriver may derive prediction samples of the current block. For example, the inter predictor of the encoding apparatus may search for a block similar to the current block in a certain region (search region) of the reference pictures through motion estimation, and derive a reference block whose difference from the current block is minimum, or less than or equal to a certain level. Based on this, the reference picture index indicating a reference picture on which the reference block is located may be derived, and based on the difference in position between the reference block and the current block, the motion vector may be derived. The encoding apparatus may determine a mode from among various prediction modes, which is applied to the current block. The encoding apparatus may compare rate-distortion (RD) costs for the various prediction modes, and determine the optimal prediction mode for the current block.

For example, when the skip mode or the merge mode is applied to the current block, the encoding apparatus may construct a merge candidate list, and derive a reference block whose difference from the current block is minimum or less than or equal to a certain level from among reference blocks which merge candidates included in the merge candidate list indicate. In this case, the merge candidate associated with the derived reference block may be selected, and merge index information indicating the selected merge candidate may be generated and be signaled to the decoding apparatus. The motion information of the current block may be derived using motion information of the selected merge candidate.

As another example, when the (A)MVP mode is applied to the current block, the encoding apparatus may construct an (A)MVP candidate list, and use the motion vector of an mvp (motion vector predictor) candidate selected from among mvp candidates included in the (A)MVP candidate list as the mvp of the current block. In this case, for example, the motion vector indicating the reference block derived by the above-described motion estimation may be used as a motion vector of the current block, and among the mvp candidates, the mvp candidate which has a motion vector whose difference from the motion vector of the current block is smallest may be the selected mvp candidate. MVD (motion vector difference), which is a difference obtained by subtracting the mvp from the motion vector of the current block, may be derived. In this case, the information on the MVD may be signaled to the decoding apparatus. Additionally, when the (A)MVP mode is applied, a value of the reference picture index may be configured as a reference picture index information and signaled separately to the decoding apparatus.

The encoding apparatus may derive residual samples based on the prediction samples (S710). The encoding apparatus may derive the residual samples via comparison of original samples of the current block and the prediction samples.

The encoding apparatus encodes image information including prediction information and residual information (S720). The encoding apparatus may output the encoded image information in the form of a bitstream. The prediction information may include a prediction mode information (e.g., skip flag, merge flag, mode index or the like) and information on motion information as information on the prediction procedure. The information on motion information may include candidate selection information (e.g., merge index, mvp flag, or mvp index), which is information for deriving a motion vector. Further, the information on motion information may include information on the above-described MVD, and/or the reference picture index information. Further, the information on motion information may include information indicating whether the L0 prediction, the L1 prediction, or bi-prediction is applied. The residual information is information on the residual samples. The residual information may include information on quantized transform coefficients for the residual samples.

The output bitstream may be stored in a (digital) storage medium and transferred to the decoding apparatus, or may be transferred to the decoding apparatus through a network.

Meanwhile, as described above, the encoding apparatus may generate a reconstructed picture (including reconstructed samples and a reconstructed block) based on the reference samples and the residual samples. This is to derive the same prediction result in the encoding apparatus as one that is performed in the decoding apparatus, and the reason is that coding efficiency can be increased through this. Therefore, the encoding apparatus may store a reconstructed picture (or reconstructed samples, a reconstructed block) in the memory, and utilize it as a reference picture for inter prediction. The in-loop filtering process and the like may be further applied to the reconstructed picture as described above.

The video/image decoding procedure based on inter prediction may schematically include, for example, the following.

Figure 8:
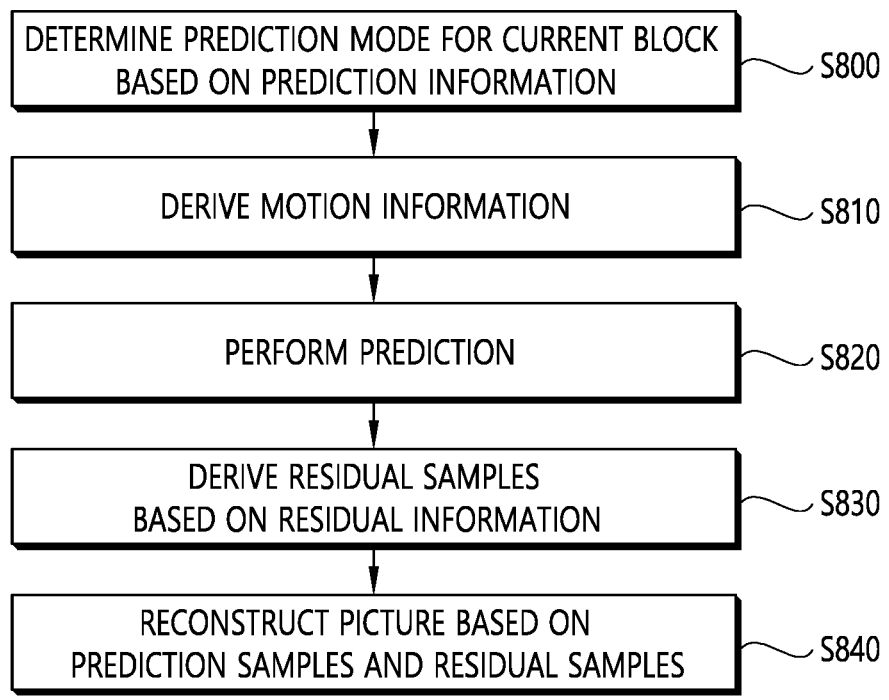
FIG. 8 represents an example of an inter prediction based video/image decoding method.

FIG. 8 represents an example of an inter prediction based video/image decoding method.

The decoding apparatus may perform an operation corresponding to the operation which has been performed in the encoding apparatus. The decoding apparatus may perform prediction on the current block and derive the prediction samples based on the received prediction information.

Specifically, referring to FIG. 8, the decoding apparatus may determine the prediction mode for the current block based on the received prediction information from the bitstream (S800). The decoding apparatus may determine which inter prediction mode is applied to the current block based on the prediction mode information in the prediction information.

For example, it may be determined whether the merge mode is applied to the current block or (A)MVP mode is determined based on the merge flag. Alternatively, one inter prediction mode may be selected from among various inter prediction mode candidates based on the merge index. The inter prediction mode candidates may include various inter prediction modes, such as skip mode, merge mode, and/or (A)MVP mode.

The decoding apparatus derives the motion information of the current block based on the determined inter prediction mode (S810). For example, when the skip mode or the merge mode is applied to the current block, the decoding apparatus may construct a merge candidate list to be described later, and select one of merge candidates included in the merge candidate list. The selection may be performed based on the above-described selection information (merge index). The motion information of the current block may be derived using motion information of the selected merge candidate. The motion information of the selected merge candidate may be used as the motion information of the current block.

As another example, when the (A)MVP mode is applied to the current block, the decoding apparatus may construct an (A)MVP candidate list, and use the motion vector of an mvp (motion vector predictor) candidate selected from among mvp candidates included in the (A)MVP candidate list as the mvp of the current block. The selection may be performed based on the above-described selection information (mvp flag or mvp index). In this case, MVD of the current block may be derived based on information on the MVD, and the motion vector of the current block may be derived based on the MVD and the MVP of the current block. Further, the reference picture index of the current block may be derived based on the reference picture index information. The picture in the reference picture list concerning the current block, which the reference picture index indicates may be derived as a reference picture which is referred to for the inter prediction of the current block.

Meanwhile, motion information of the current block may be derived without constructing a candidate list, and in this case, the constructing of the candidate list as described above may be omitted.

The decoding apparatus may generate prediction samples for the current block based on the motion information of the current block (S820). In this case, the reference picture may be derived based on the reference picture index of the current block, and the prediction samples of the current block may be derived using the samples of the reference block on the reference picture which is indicated by the motion vector of the current block. In this case, a prediction sample filtering procedure for the all or some of prediction samples of the current block may be further performed according to circumstances as described later.

For example, the inter predictor of the encoding apparatus may include a prediction mode determiner, a motion information deriver, and a prediction sample deriver, may determine a prediction mode for the current block based on prediction mode information received at the prediction mode determiner, may derive motion information (motion vector and/or reference picture index and/or the like) of the current block based on information on motion information received at the motion information deriver, and may derive prediction samples of the current block at the prediction sample deriver.

The decoding apparatus generates the residual samples for the current block based on the received residual information (S830). The decoding apparatus may generate the reconstructed samples for the current block based on the residual samples and the prediction samples, and generate the reconstructed picture based on these reconstructed samples (S840). Hereinafter, the in-loop filtering procedure may be applied to the reconstructed picture as described above.

Meanwhile, as described above, a high level syntax (HLS) may be coded/signaled for video/image coding. The coded picture may be composed of one or more slices. A parameter describing the coded picture is signaled in the picture header, and a parameter describing the slice is signaled in the slice header. The picture header is carried in the form of a NAL unit itself. The slice header is present at a start portion of the NAL unit including a payload of the slice (i.e., slice data).

Each picture is related to a picture header. The picture may be composed of different types of slices (intra-coded slice (i.e., I slice) and inter-coded slice (i.e., P slice and B slice)). Accordingly, the picture header may include syntax elements necessary for the intra slice of the picture and the inter slice of the picture. For example, the syntax of the picture header may be as in the following Table 1.

TABLE 1

|  | Descriptor |
|---|---|
| picture_header_rbsp( ) { |  |
|   non_reference_picture_flag | u(1) |
|   gdr_pic_flag | u(1) |
|   no_output_of_prior_pics_flag | u(1) |
|   if( gdr_pic_flag ) |  |
|     recovery_poc_cnt | ue(v) |
|   ph_pic_parameter_set_id | ue(v) |
|   if( sps_poc_msb_flag ) { |  |
|     ph_poc_msb_present_flag | u(1) |
|     if( ph_poc_msb_present_flag ) |  |
|       poc_msb_val | u(v) |
|   } |  |
|   if( sps_subpic_id_present_flag && !sps_subpic_id_signalling_flag ) { |  |
|     ph_subpic_id_signalling_present_flag | u(1) |
|     if( ph_subpics_id_signalling_present_flag ) { |  |
|       ph_subpic_id_len_minus1 | ue(v) |
|       for( i = 0; i <= sps_num_subpics_minus1; i++ ) |  |
|         ph_subpic_id[ i ] | u(v) |
|     } |  |
|   } |  |
|   if( !sps_loop_filter_across_virtual_boundaries_disabled_present_flag ) { |  |
|     ph_loop_filter_across_virtual_boundaries_disabled_present_flag | u(1) |
|     if( ph_loop_filter_across_virtual_boundaries_disabled_present_flag ) { |  |
|       ph_num_ver_virtual_boundaries | u(2) |
|       for( i = 0; i < ph_num_ver_virtual_boundaries; i++ ) |  |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) |  |
|         ph_virtual_boundaries_pos_y[ i ] | u(13) |
|     } |  |
|   } |  |
|   if( separate_colour_plane_flag == 1 ) |  |
|     colour_plane_id | u(2) |
|   if( output_flag_present_flag ) |  |
|     pic_output_flag | u(1) |

TABLE 1-continued

| | Descriptor |
|---|---|
| pic_rpl_present_flag | u(1) |
| if( pic_rpl_present_flag ) { | |
|   for( i = 0; i < 2; i++ ) { | |
|     if( num_ref_pic_lists_in_sps[ i ] > 0  &&  !pps_ref_pic_list_sps_idc[ i ]  && | |
|       ( i  ==  0  ||  ( i  ==  1  &&  rpl1_idx_present_flag ) ) ) | |
|       pic_rpl_sps_flag[ i ] | u(1) |
|     if( pic_rpl_sps_flag[ i ] ) { | |
|       if( num_ref_pic_lists_in_sps[ i ] > 1  && | |
|         ( i  ==  0  ||  ( i  ==  1  &&  rpl1_idx_present_flag ) ) ) | |
|       pic_rpl_idx[ i ] | u(v) |
|     } else | |
|       ref_pic_list_struct( i, num_ref_pic_lists_in_sps[ i ] ) | |
|     for( j = 0; j < NumLtrpEntries[ i ][ RplsIdx[ i ] ]; j++ ) { | |
|       if( ltrp_in_slice_header_flag[ i ][ RplsIdx[ i ] ] ) | |
|         pic_poc_lsb_lt[ i ][ j ] | u(v) |
|       pic_delta_poc_msb_present_flag[ i ][ j ] | u(1) |
|       if( pic_delta_poc_msb_present_flag[ i ][ j ] ) | |
|         pic_delta_poc_msb_cycle_lt[ i ][ j ] | ue(v) |
|     } | |
|   } | |
| } | |
| if( partition_constraints_override_enabled_flag ) { | |
|   partition_constraints_override_flag | ue(v) |
|   if( partition_constraints_override_flag ) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma  !=  0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice  !=  0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma  !=  0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| if( cu_qp_delta_enabled_flag ) { | |
|   pic_cu_qp_delta_subdiv_intra_slice | ue(v) |
|   pic_cu_qp_delta_subdiv_inter_slice | ue(v) |
| } | |
| if( pps_cu_chroma_qp_offset_list_enabled_flag ) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag ) | |
|   pic_temporal_mvp_enabled_flag | u(1) |
| if(!pps_mvd_l1_zero_idc ) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag ) | |
|   pic_five_minus_max_num_subblock_merge_cand | ue(v) |
| if( sps_fpel_mmvd_enabled_flag ) | |
|   pic_fpel_mmvd_enabled_flag | u(1) |
| if( sps_bdof_pic_present_flag ) | |
|   pic_disable_bdof_flag | u(1) |
| if( sps_dmvr_pic_present_flag ) | |
|   pic_disable_dmvr_flag | u(1) |
| if( sps_prof_pic_present_flag ) | |
|   pic_disable_prof_flag | u(1) |
| if( sps_triangle_enabled_flag && MaxNumMergeCand  >=  2  && | |
|   !pps_max_num_merge_cand_minus_max_num_triangle_cand_plus1 ) | |
|   pic_max_num_merge_cand_minus_max_num_triangle_cand | ue(v) |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |

TABLE 1-continued

|  | Descriptor |
|---|---|
|     pic_sao_enabled_present_flag | u(1) |
|     if( pic_sao_enable_present_flag ) { |  |
|       pic_sao_luma_enabled_flag | u(1) |
|       if(ChromaArrayType  !=  0 ) |  |
|         pic_sao_chroma_enabled_flag | u(1) |
|     } |  |
|   } |  |
|   if( sps_alf_enabled_flag ) { |  |
|     pic_alf_enabled_present_flag | u(1) |
|     if( pic_alf_enabled_present_flag ) { |  |
|       pic_alf_enabled_flag | u(1) |
|       if( pic_alf_enabled_flag ) { |  |
|         pic_num_alf_aps_ids_luma | u(3) |
|         for( i = 0; i < pic_num_alf_aps_ids_luma, i++ ) |  |
|           pic_alf_aps_id_luma[ i ] | u(3) |
|         if( ChromaArrayType  !=  0 ) |  |
|           pic_alf_chroma_idc | u(2) |
|         if( pic_alf_chroma_idc ) |  |
|           pic_alf_aps_id_chroma | u(3) |
|       } |  |
|     } |  |
|   } |  |
|   if ( !pps_dep_quant_enabled_flag ) |  |
|     pic_dep_quant_enabled_flag | u(1) |
|   if( !pic_dep_quant_enabled_flag ) |  |
|     sign_data_hiding_enabled_flag | u(1) |
|   if( deblocking_filter_override_enabled_flag ) { |  |
|     pic_deblocking_filter_override_present_flag | u(1) |
|     if( pic_deblocking_filter_override_present_flag ) { |  |
|       pic_deblocking_filter_override_flag | u(1) |
|       if( pic_deblocking_filter_override_flag ) { |  |
|         pic_deblocking_filter_disabled_flag | u(1) |
|         if( !pic_deblocking_filter_disabled_flag ) { |  |
|           pic_beta_offset_div2 | se(v) |
|           pic_tc_offset_div2 | se(v) |
|         } |  |
|       } |  |
|     } |  |
|   } |  |
|   if( sps_lmcs_enabled_flag ) { |  |
|     pic_lmcs_enabled_flag | u(1) |
|     if( pic_lmcs_enabled_flag ) { |  |
|       pic_lmcs_aps_id | u(2) |
|       if( ChromaArrayType  !=  0 ) |  |
|         pic_chroma_residual_scale_flag | u(1) |
|     } |  |
|   } |  |
|   if( sps_scaling_list_enabled_flag ) { |  |
|     pic_scaling_list_present_flag | u(1) |
|     if( pic_scaling_list_present_flag ) |  |
|       pic_scaling_list_aps_id | u(3) |
|   } |  |
|   if( picture_header_extension_present_flag ) { |  |
|     ph_extension_length | ue(v) |
|     for( i = 0; i < ph_extension_length; i++) |  |
|       ph_extension_data_byte[ i ] | u(8) |
|   } |  |
|   rbsp_trailing_bits( ) |  |
| } |  |

Among syntax elements of Table 1, syntax elements including "intra slice" in their titles (e.g., pic_log2_diff_min_qt_min_cb_intra_slice_luma) are syntax elements being used in I slice of the corresponding picture, and syntax elements (e.g., pic_temporal_mvp_enabled_flag) related to syntax elements including "inter_slice" in their titles (e.g., pic_log2_diff_min_qt_min_cb_inter_slice, mvp, mvd, mmvd, and merge) are syntax elements being used in P slice and/or B slice of the corresponding picture.

That is, the picture header includes all of syntax elements necessary for the intra-coded slice and syntax elements necessary for the inter-coded slice for every single picture. However, this is useful only with respect to the picture including mixed type slices (picture including all of the intra-coded slice and the inter-coded slice). In general, since the picture does not include the mixed type slices (i.e., the general picture includes only the intra-coded slices or only the inter-coded slices), it is unnecessary to perform signaling of all data (syntax elements being used in the intra-coded slice and syntax elements being used in the inter-coded slice).

The following drawings have been prepared to explain a detailed example of the present document. Since the name of a detailed device or the name of detailed signal/information is exemplarily presented, the technical features of the present document are not limited to the detailed names used in the following drawing.

The present document provides the following methods in order to solve the above-described problem. Items of each method may be individually applied, or may be applied in combination.

1. A flag in picture header to specify whether syntax elements that are needed only by intra coded slices are present in the picture header may be signaled. The flag may be referred to as intra_signaling_present_flag.
   a) When intra_signaling_present_flag is equal to 1, syntax elements that are needed by intra coded slices are present in the picture header. Likewise, when intra_signaling_present_flag is equal to 0, syntax elements that are needed by intra coded slices are not present in the picture header.
   b) The value of intra_signaling_present_flag in a picture header shall be equal to 1 on the picture associated with the picture header has at least one intra coded slice.
   c) The value of intra_signaling_present_flag in a picture header may be equal to 1 even when the picture associated with the picture header does not have intra coded slice.
   d) When a picture has one or more subpicture(s) containing intra coded slices only and it is anticipated that one or more of the subpicture(s) may be extracted and merged with subpictures which contains one or more inter coded slices, the value of intra_signaling_present_flag should be set equal to 1.
2. A flag in picture header to specify whether syntax elements that are needed only by inter coded slices are present in the picture header may be signaled. The flag may be referred to as inter_signaling_present_flag.
   a) When inter_signaling_present_flag is equal to 1, syntax elements that are needed by inter coded slices are present in the picture header. Likewise, when inter_signaling_present_flag is equal to 0, syntax elements that are needed by inter coded slices are not present in the picture header.
   b) The value of inter_signaling_present_flag in a picture header shall be equal to 1 on the picture associated with the picture header has at least one inter coded slice.
   c) The value of inter_signaling_present_flag in a picture header may be equal to 1 even when the picture associated with the picture header does not have inter coded slice.
   d) When a picture has one or more subpicture(s) containing inter coded slices only and it is anticipated that one or more of the subpicture(s) may be extracted and merged with subpictures which contains one or more intra coded slices, the value of inter_signaling_present_flag should be set equal to 1.
3. The above flags (intra_signaling_present_flag and inter_signaling_present_flag) may be signaled in other parameter set such as picture parameter set (PPS) instead of in picture header).
4. Another alternative for signaling the above flags can be as follow.
   a) Two variables IntraSignalingPresentFlag and InterSignalingPresentFlag which specify whether syntax elements needed by intra coded slices and syntax element needed by inter coded slices, respectively, present in the picture header or not may be defined.
   b) A flag called mixed_slice_types_present_flag in the picture header may be signaled. When mixed_slice_types_present_flag is equal to 1, the value of IntraSignalingPresentFlag and InterSignalingPresentFlag are set to be equal to 1.
   c) When mixed_slice_types_present_flag is equal to 0, additional flag called intra_slice_only_flag may be signaled in the picture header and the following applies. If intra_slice_only_flag is equal to 1, the value of IntraSignalingPresentFlag is set equal to 1 and the value of InterSignalingPresentFlag is set equal to 0. Otherwise, the value of IntraSignalingPresentFlag is set equal to 0 and the value of InterSignalingPresentFlag is set equal to 1.
5. A fixed length syntax element in picture header, which may be called slice_types_idc, which specifies the following information may be signaled.
   a) Whether the picture associated with the picture header contain intra coded slices only. For this type, the value of slice_types_idc may be set equal to 0.
   b) Whether the picture associated with the picture header contain inter coded slices only. The value of slice_types_idc may be set equal to 1.
   c) Whether the picture associated with the picture header may contain intra coded slices and inter coded slices. The value of slice_types_idc may be set equal to 2.
   Note that when slice_types_idc has value equal to 2, it is still possible that the picture contains intra coded slices only or inter coded slices only.
   d) Other values of slice_types_idc may be reserved for future use.
6. For slice_types_idc semantics in a picture header, the following constraints may be further specified.
   a) When the picture associated with the picture header has one or more intra coded slice, the value of slice_types_idc shall not be equal to 1.
   b) When the picture associated with the picture header has one or more inter coded slice, the value of slice_types_idc shall not be equal to 0.
7. slice_types_idc may be signaled in other parameter set such as picture parameter set (PPS) instead of in picture header.

As an embodiment, the encoding apparatus and the decoding apparatus may use the following Table 2 and Table 3 as the syntax and semantics of the picture header based on the methods of 1 and 2 as described above.

TABLE 2

|  | Descriptor |
|---|---|
| picture_header_rbsp( ) { | |
| ... | |
|   intra_signalling_present_flag | u(1) |
|   inter_signalling_present_flag | u(1) |
|   if( partition_constraints_override_enabled_flag ) { | |
|     partition_constraints_override_flag | ue(v) |
|     if( partition_constraints_override_flag ) { | |
|       if( intra_signalling_present_flag ){ | |

TABLE 2-continued

| | Descriptor |
|---|---|
|     pic_log2_diff_min_qt_min_cb_intra_slice_luma | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( qtbtt_dual_tree_intra_flag ) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
|   if( inter_signalling_present_flag ){ | |
|     pic_log2_diff_min_qt_min_cb_inter_slice | ue(v) |
|     pic_max_mtt_hierarchy_depth_inter_slice | ue(v) |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|   } | |
| } | |
| if( intra_signalling_present_flag ){ | |
|   if( cu_qp_delta_enabled_flag ) | |
|     pic_cu_qp_delta_subdiv_intra_slice | ue(v) |
|   if( pps_cu_chroma_qp_offset_list_enabled_flag ) | |
|     pic_cu_chroma_qp_offset_subdiv_intra_slice | ue(v) |
| } | |
| if( inter_signalling_present_flag ){ | |
|   if( cu_qp_delta_enabled_flag ) | |
|     pic_cu_qp_delta_subdiv_inter_slice | ue(v) |
|   if( pps_cu_chroma_qp_offset_list_enabled_flag ) | |
|     pic_cu_chroma_qp_offset_subdiv_inter_slice | ue(v) |
|   if( sps_temporal_mvp_enabled_flag ) | |
|     pic_temporal_mvp_enabled_flag | u(1) |
|   if(!pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
|     !pps_max_num_merge_cand_minus_max_num_triangle_cand_minus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|   } | |
| } | |
| ... | |
| } | |

TABLE 3 intra_signalling_present_flag equal to 1 specifies that syntax elements used only by intra coded slices are present in the picture header. intra_signalling_present_flag equal to 0 specifies that syntax elements used only by intra coded slices are not present in the picture header.
It is a requirement of bitstream conformance that, the value of intra_signalling_present_flag shall be equal to 1 when the picture associated with the picture header has one or more slice with slice_type equal to I.
inter_signalling_present_flag equal to 1 specifies that syntax elements used only by inter coded slices are present in the picture header. inter_signalling_present_flag equal to 0 specifies that syntax elements used only by inter coded slices are not present in the picture header.
It is a requirement of bitstream conformance that, the value of inter_signalling_present_flag shall be equal to 1 when the picture associated with the picture header has one or more slice with slice_type equal to P or B.

NOTE—:
The value of both intra_signalling_present_flag and inter_signalling_present_flag should be set equal to 1 in the picture header asscated with picture containing one or more subpictures containing intra coded slice(s) which may be merged with one or more subpicture(s) containing inter coded slices(s)

Referring to Table 2 and Table 3, if the value of intra_signaling_present_flag is 1, this may represent that the syntax element being used only in the intra-coded slice is present in the picture header. If the value of the intra_signaling_present_flag is 0, this may represent that the syntax element being used only in the intra-coded slice is not present in the picture header. Accordingly, if the picture related to the picture header includes one or more slices having the slice type of I slice, the value of the intra_signaling_present_flag becomes 1. Further, if the picture related to the picture header does not include the slices having the slice type of I slice, the value of the intra_signaling_present_flag becomes 0.

If the value of the inter_signaling_present_flag is 1, this may represent that the syntax element being used only in the inter-coded slice is present in the picture header. If the value of the inter_signaling_present_flag is 0, this may represent that the syntax element being used only in the inter-coded slice is not present in the picture header. Accordingly, if the picture related to the picture header includes one or more slices having the slice type of P slice and/or B slice, the value of the intra_signaling_present_flag becomes 1. Further, if the picture related to the picture header does not include the slices having the slice type of P slice and/or B slice, the value of the intra signaling_present_flag becomes 0.

Further, in case of the picture including one or more subpictures including the intra-coded slices which can be merged with one or more subpictures including the inter-coded slices, both the value of the intra_signaling_present_flag and the value of the inter_signaling_present_flag are set to be 1.

For example, in case that only the inter-coded slices (P slice and/or B slice) are included in the current picture, the encoding apparatus may determine the value of the inter_signaling_present_flag as 1, and the value of the intra_signaling_present_flag as 0.

As another example, in case that only the intra-coded slice (I slice) is included in the current picture, the encoding apparatus may determine the value of the inter_signaling_present_flag as 0, and the value of the intra_signaling_present_flag as 1.

As still another example, in case that at least one inter-coded slice or at least one intra-coded slice is included in the current picture, the encoding apparatus may determine the value of the inter_signaling_present_flag and the value of the intra_signaling_present_flag as 1 in all.

In case that the value of the intra_signaling_present_flag is determined as 0, the encoding apparatus may generate image information in which the syntax elements necessary for the intra slice are excluded or omitted, and only the syntax elements necessary for the inter slice is included in the picture header. If the value of the inter_signaling_present_flag is determined as 0, the encoding apparatus may generate the image information in which the syntax elements necessary for the inter slice are excluded or omitted, and only the syntax elements necessary for the intra slice is included in the picture header.

If the value of the inter_signaling_present_flag obtained from the picture header in the image information is 1, the decoding apparatus may determine that at least one inter-coded slice is included in the corresponding picture, and may parse the syntax elements necessary for the intra prediction from the picture header. If the value of the inter_signaling_present_flag is 0, the decoding apparatus may determine that only the intra-coded slice is included in the corresponding picture, and may parse the syntax elements necessary for the intra prediction from the picture header. If the value of the intra_signaling_present_flag obtained from the picture header in the image information is 1, the decoding apparatus may determine that at least one intra-coded slice is included in the corresponding picture, and may parse the syntax elements necessary for the intra prediction from the picture header. If the value of the intra_signaling_present_flag is 0, the decoding apparatus may determine that only the inter-coded slice is included in the corresponding picture, and may parse the syntax elements necessary for the inter prediction from the picture header.

As another embodiment, the encoding apparatus and the decoding apparatus may use the following Table 4 and Table 5 as the syntax and semantics of the picture header based on the above methods of 5 and 6.

TABLE 4

|  | Descriptor |
|---|---|
| picture_header_rbsp( ) { | |
| ... | |
|   slice_type_idc | u(1) |
|   if( partition_constraints_override_enabled_flag ) { | |
|     partition_constraints_override_flag | ue(v) |
|     if( partition_constraints_override_flag ) { | |
|       if( slice_type_idc != 1 ){ | |

TABLE 4-continued

| | Descriptor |
|---|---|
|       pic_log2_diff_min_qt_min_cb_intra_slice_luma | ue(v) |
|       pic_max_mtt_hierarchy_depth_intra_slice_luma | ue(v) |
|       if( pic_max_mtt_hierarchy_depth_intra_slice_luma != 0 ) { | |
|         pic_log2_diff_max_bt_min_qt_intra_slice_luma | ue(v) |
|         pic_log2_diff_max_tt_min_qt_intra_slice_luma | ue(v) |
|       } | |
|       if( qtbtt_dual_tree_intra_flag ) { | |
|         pic_log2_diff_min_qt_min_cb_intra_slice_chroma | ue(v) |
|         pic_max_mtt_hierarchy_depth_intra_slice_chroma | ue(v) |
|         if( pic_max_mtt_hierarchy_depth_intra_slice_chroma != 0 ) { | |
|           pic_log2_diff_max_bt_min_qt_intra_slice_chroma | ue(v) |
|           pic_log2_diff_max_tt_min_qt_intra_slice_chroma | ue(v) |
|         } | |
|       } | |
|     } | |
|     if( slice_type_idc != 0 ){ | |
|       pic_log2_diff_min_qt_min_cb_inter_slice | ue(v) |
|       pic_max_mtt_hierarchy_depth_inter_slice | ue(v) |
|       if( pic_max_mtt_hierarchy_depth_inter_slice != 0 ) { | |
|         pic_log2_diff_max_bt_min_qt_inter_slice | ue(v) |
|         pic_log2_diff_max_tt_min_qt_inter_slice | ue(v) |
|       } | |
|     } | |
|   } | |
| } | |
| if( slice_type_idc != 1 ){ | |
|   if( cu_qp_delta_enabled_flag ) | |
|     pic_cu_qp_delta_subdiv_intra_slice | ue(v) |
|   if( pps_cu_chroma_qp_offset_list_enabled_flag ) | |
|     pic_cu_chroma_qp_offset_subdiv_intra_slice | ue(v) |
| } | |
| if( slice_type_idc != 0 ){ | |
|   if( cu_qp_delta_enabled_flag ) | |
|     pic_cu_qp_delta_subdiv_inter_slice | ue(v) |
|   if( pps_cu_chroma_qp_offset_list_enabled_flag ) | |
|     pic_cu_chroma_qp_offset_subdiv_inter_slice | ue(v) |
|   if( sps_temporal_mvp_enabled_flag ) | |
|     pic_temporal_mvp_enabled_flag | u(1) |
|   if(!pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
|       !pps_max_num_merge_cand_minus_max_num_triangle_cand_minus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|   } | |
| } | |
| ... | |
| } | |

TABLE 5 slice_types_idc equal to 0 specifies that all slices of the picture associated with the picture header are I slices.
slice_types_idc equal to 1 specifies that all slices of the picture associated with the picture header are either P or B slices. slice_types_idc equal to 2 specifies that slices of the picture associated with the picture header may be I, P, and/ or B slices. The value slice_types_idc equal to 3 is reserved.
It is a requirement of bitstream conformance that, the value of slice_types_idc shall be not be equal to either 0 or 1 when the picture associated with the picture header has intra coded slice(s) and inter coded slice(s).

NOTE—:
The value slice_types_idc should be set equal to 2 in the picture header asscaited with picture containing one or more subpictures containing intra coded slice(s) which may be merged with one or more subpicture(s) containing inter coded slices(s)

Referring to Table 4 and Table 5, if the value of slice_types_idc is 0, this represents that the type of all slices in the picture related to the picture header is I slice. If the value of the slice_types_idc is 1, this represents that the type of all slices in the picture related to the picture header is P or B slice. If the value of the slice_types_idc is 2, this represents that the slice type of the slices in the picture related to the picture header is I, P, and/or B slice.

For example, if only the intra-coded slice is included in the current picture, the encoding apparatus may determine the value of the slice_types_idc as 0, and may include only the syntax elements necessary for decoding of the intra slice in the picture header. That is, in this case, the syntax elements necessary for the inter slice are not included in the picture header.

As another example, if only the inter-coded slice is included in the current picture, the encoding apparatus may determine the value of the slice_types_idc as 1, and may include only the syntax elements necessary for decoding of the inter slice in the picture header. That is, in this case, the syntax elements necessary for the intra slice are not included in the picture header.

As still another example, if at least one inter-coded slice and at least one intra-coded slice are included in the current picture, the encoding apparatus may determine the value of the slice_types_idc as 2, and may include all of the syntax elements necessary for the decoding of the inter slice and the syntax elements necessary for the decoding of the intra slice in the picture header.

If the value of the slice_types_idc obtained from the picture header in the image information is 0, the decoding apparatus may determine that only the intra-coded slice is included in the corresponding picture, and may parse the syntax elements necessary for the decoding of the intra-coded slice from the picture header. If the value of the slice_types_idc is 1, the decoding apparatus may determine that only the inter-coded slice is included in the corresponding picture, and may parse the syntax elements necessary for the decoding of the inter-coded slice from the picture header. If the value of the slice_types_idc is 2, the decoding apparatus may determine that at least one intra-coded slice and at least one inter-coded slice are included in the corresponding picture, and may parse the syntax elements necessary for the decoding of the intra-coded slice and the syntax elements necessary for the decoding of the inter-coded slice from the picture header.

As still another embodiment, the encoding apparatus and the decoding apparatus may use one flag representing whether the picture includes the intra- and inter-coded slices. If the flag is true, that is, if the value of the flag is 1, all of the intra slice and the inter slice may be included in the corresponding picture. In this case, the following Table 6 and Table 7 may be used as the syntax and the semantics of the picture header.

TABLE 6

| | Descriptor |
|---|---|
| picture_header_rbsp( ) { | |
| ... | |
|   mixed_slice_signalling_present_flag | u(1) |
|   if(!mixed_slice_signalling_present_flag) | |
|     intra_slice_only_flag | u(1) |
|   if( partition_constraints_override_enabled_flag ) { | |
|     partition_constraints_override_flag | ue(v) |
|     if( partition_constraints_override_flag ) { | |
|       if(IntraSignallingPresentFlag){ | |
|         pic_log2_diff_min_qt_min_cb_intra_slice_luma | ue(v) |
|         pic_max_mtt_hierarchy_depth_intra_slice_luma | ue(v) |
|         if( pic_max_mtt_hierarchy_depth_intra_slice_luma != 0 ) { | |
|           pic_log2_diff_max_bt_min_qt_intra_slice_luma | ue(v) |
|           pic_log2_diff_max_tt_min_qt_intra_slice_luma | ue(v) |
|         } | |
|         if( qtbtt_dual_tree_intra_flag ) { | |
|           pic_log2_diff_min_qt_min_cb_intra_slice_chroma | ue(v) |
|           pic_max_mtt_hierarchy_depth_intra_slice_chroma | ue(v) |
|           if( pic_max_mtt_hierarchy_depth_intra_slice_chroma != 0 ) { | |
|             pic_log2_diff_max_bt_min_qt_intra_slice_chroma | ue(v) |
|             pic_log2_diff_max_tt_min_qt_intra_slice_chroma | ue(v) |
|           } | |
|         } | |
|       } | |
|       if(InterSignallingPresentFlag){ | |
|         pic_log2_diff_min_qt_min_cb_inter_slice | ue(v) |
|         pic_max_mtt_hierarchy_depth_inter_slice | ue(v) |
|         if( pic_max_mtt_hierarchy_depth_inter_slice != 0 ) { | |

TABLE 6-continued

| | Descriptor |
|---|---|
|           pic_log2_diff_max_bt_min_qt_inter_slice | ue(v) |
|           pic_log2_diff_max_tt_min_qt_inter_slice | ue(v) |
|         } | |
|       } | |
|     } | |
|   } | |
| } | |
| if(IntraSignallingPresentFlag){ | |
|   if( cu_qp_delta_enabled_flag ) | |
|     pic_cu_qp_delta_subdiv_intra_slice | ue(v) |
|   if( pps_cu_chroma_qp_offset_list_enabled_flag ) | |
|     pic_cu_chroma_qp_offset_subdiv_intra_slice | ue(v) |
| } | |
| if(InterSignallingPresentFlag){ | |
|   if( cu_qp_delta_enabled_flag ) | |
|     pic_cu_qp_delta_subdiv_inter_slice | ue(v) |
|   if( pps_cu_chroma_qp_offset_list_enabled_flag ) | |
|     pic_cu_chroma_qp_offset_subdiv_inter_slice | ue(v) |
|   if( sps_temporal_mvp_enabled_flag ) | |
|     pic_temporal_mvp_enabled_flag | u(1) |
|   if(!pps_mvd_l1_zero_idc ) | |
|     mvd_l1_zero_flag | u(1) |
|   if( !pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag ) | |
|     pic_disable_bdof_flag | u(1) |
|   if( sps_dmvr_pic_present_flag ) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && | |
|     !pps_max_num_merge_cand_minus_max_num_triangle_cand_minus1 ) | |
|     pic_max_num_merge_cand_minus_max_num_triangle_cand | ue(v) |
| } | |
| if ( sps_ibc_enabled_flag ) | |
|   pic_six_minus_max_num_ibc_merge_cand | ue(v) |
| if( sps_joint_cbcr_enabled_flag ) | |
|   pic_joint_cbcr_sign_flag | u(1) |
| if( sps_sao_enabled_flag ) { | |
|   pic_sao_enabled_present_flag | u(1) |
|   if( pic_sao_enabled_present_flag ) { | |
|     pic_sao_luma_enabled_flag | u(1) |
|     if(ChromaArrayType != 0 ) | |
|       pic_sao_chroma_enabled_flag | u(1) |
|   } | |
| } | |
| ... | |
| } | |

TABLE 7 mixed_slice_signalling_present_flag equal to 1 specifies that the picture associated with the picture header may have
one or more slices with different types. mixed_slice_signalling_present_flag equal to 0 specifies that the the picture
associated with the picture header contains data pertaining to only a single slice type.
The variables InterSignallingPresentFlag and IntraSignallingPresentFlag are defined to specify whether syntax
elements needed by intra coded slices and syntax elements needed by inter coded slices respectively, are present in
the picture or not. When mixed_slice_signalling_present_flag is equal to 1. IntraSignallingPresentFlag and
InterSignallingPresentFlag are set to be equal to 1.
intra_slice_only_flag equal to 1 specifies that the value of IntraSignallingPresentFlag is set to be equal to 1 and the
value of InterSignallingPresentFlag is set to be equal to 0. intra_slice_only_flag equal to 0 specifes that
IntraSignallingPresentFlag is set equal to 0 and the value InterSignallingPresentFlag is set equal to 1.
It is a requirement of bitstream conformance that, the value of IntraSignallingPresentFlag shall be equal to 1 when the
picture associated with the picture header has one or more slice with slice_type equal to I.
It is a requirement of bitstream conformance that, the value of InterSignallingPresentFlag shall be equal to 1 when the
picture associated with the picture header has one or more slice with slice_type equal to P or B.

NOTE—:
The values of both intra_signalling_present_flag and inter_signalling_present_flag should be set equal to 1 in the picture header associated
with picture containing one or more subpictures containing intra coded slice(s) which may be merged with one or more subpicture(s) containing
inter coded slices(s)

Referring to Table 6 and Table 7, if the value of mixed slice signaling_present_flag is 1, this may represent that the picture related to the corresponding picture header has one or more slices having different types. If the value of the mixed_slice_signaling_present_flag is 0, this may mean that the picture related to the corresponding picture header includes data related to only a single slice type.

Variables InterSignalingPresentFlag and IntraSignalingPresentFlag represent whether the syntax element necessary for the intra-coded slice and the syntax element necessary for the inter-coded slice are present in the corresponding picture header, respectively. If the value of the mixed_slice_signaling_present_flag is 1, the values of the IntraSignalingPresentFlag and the InterSignalingPresentFlag are set to 1.

If the value of intra_slice_only_flag is set to 1, it represents that the value of IntraSignalingPresentFlag is set to 1, and the value of the InterSignalingPresentFlag is set to 0. If the value of the intra_slice_only_flag is 0, it represents that the value of the IntraSignalingPresentFlag is set to 0, and the value of the InterSignalingPresentFlag is set to 1.

If the picture related to the picture header has one or more slices having the slice type of I slice, the value of the IntraSignalingPresentFlag is set to 1. If the picture related to the picture header has one or more slices having the slice type of P or B slice, the value of the InterSignalingPresentFlag is set to 1.

For example, if only the intra-coded slice is included in the current picture, the encoding apparatus may determine the value of mixed_slice_signaling_present_flag as 0, may determine the value of intra_slice_only_flag as 1, may determine the value of IntraSignalingPresentFlag as 1, and may determine the value of InterSignalingPresentFlag as 0.

As another example, if only the inter-coded slice is included in the current picture, the encoding apparatus may determine the value of the mixed_slice_signaling_present_flag as 0, may determine the value of the intra_slice_only_flag as 0, may determine the value of the IntraSignalingPresentFlag as 0, and may determine the value of the InterSignalingPresentFlag as 1.

As still another example, if at least one intra-coded slice and at least one inter-coded slice are included in the current picture, the encoding apparatus may determine the values of the mixed_slice_signaling_present_flag, the IntraSignalingPresentFlag, and the InterSignalingPresentFlag as 1, respectively.

If the value of the mixed_slice_signaling_present_flag obtained from the picture header in the image information is 0, the decoding apparatus may determine that only the intra-coded slice or inter-coded slice is included in the corresponding picture. In this case, if the value of the intra_slice_only_flag obtained from the picture header is 0, the decoding apparatus may parse only the syntax elements necessary for decoding of the inter-coded slice from the picture header. If the value of the intra_slice_only_flag is 1, the decoding apparatus may parse only the syntax element necessary for decoding of the intra-coded slice from the picture header.

If the value of the mixed_slice_signaling_present_flag obtained from the picture header in the image information is 1, the decoding apparatus may determine that at least one intra-coded slice and at least one inter-coded slice are included in the corresponding picture, and may parse the syntax elements necessary for the decoding of the inter-coded slice and the syntax elements necessary for the decoding of the intra-coded slice from the picture header.

Figure 9:
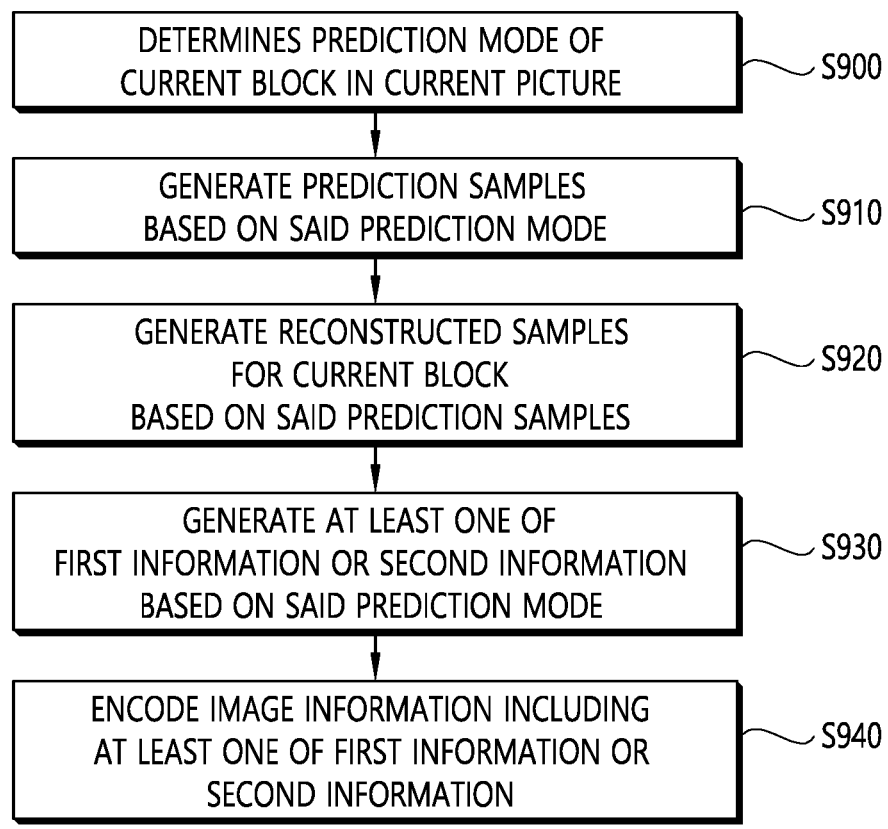
FIGS. 9 and 10 schematically represent an example of a video/image encoding method and associated components according to the embodiments of this document.
Figure 10:
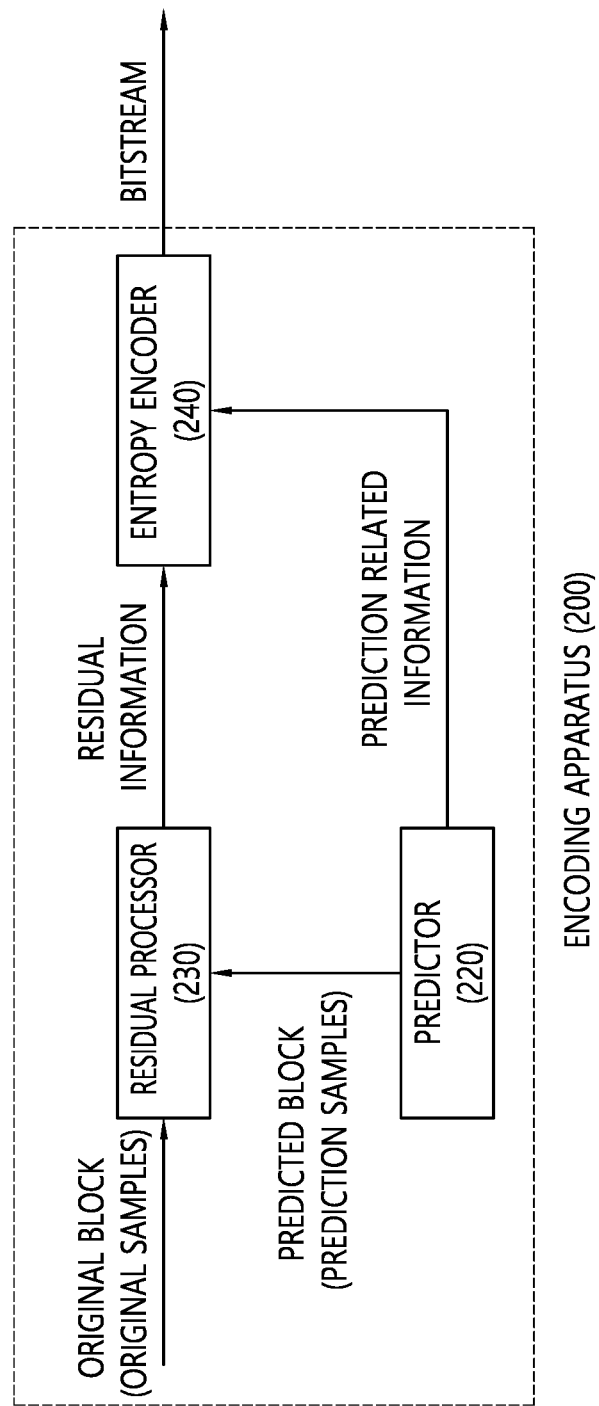

FIGS. 9 and 10 schematically represent an example of a video/image encoding method and associated components according to the embodiments of this document.

The video/image encoding method disclosed in FIG. 9 may be performed by the (video/image) encoding apparatus 200 disclosed in FIGS. 2 and 10. Specifically, for example, S900 and S910 of FIG. 9 may be performed by the predictor 220 of the encoding apparatus 200; S920 may be performed by the adder 250 of the encoding apparatus 200; and S930 and S940 may be performed by the entropy encoder 240 of the encoding apparatus 200. The video/image encoding method disclosed in FIG. 9 may include the embodiments described above in this document.

Specifically, referring to FIGS. 9 and 10, the predictor 220 of the encoding apparatus may determine the prediction mode of the current block in the current picture (S900). The current picture may include a plurality of slices. The predictor 220 of the encoding apparatus may generate prediction samples (predicted block) for the current block based on the prediction mode (S910). Here, the prediction mode may include an inter prediction mode and an intra prediction mode. When the prediction mode of the current block is the inter prediction mode, the prediction samples may be generated by the inter predictor 221 of the predictor 220. When the prediction mode of the current block is the intra prediction mode, the prediction samples may be generated by the intra predictor 222 of the predictor 220.

The residual processor 230 of the encoding apparatus may generate a residual sample and residual information based on the prediction samples and an original picture (original block, original samples). Here, the residual information is information about the residual samples, and may include information about (quantized) transform coefficients for the residual samples.

The adder (or reconstructor) of the encoding apparatus may generate reconstructed samples (reconstructed picture, reconstructed block, reconstructed sample array) by adding the residual samples generated by the residual processor 230 and the prediction samples generated by the inter predictor 221 or the intra predictor 222 (S920).

Meanwhile, the entropy encoder 240 of the encoding apparatus may generate at least one of the first information indicating whether information necessary for an inter prediction operation for a decoding process based on the prediction mode is present in a picture header associated with the current picture, or the second information indicating whether information necessary for an intra prediction operation for the decoding process are present in a picture header associated with the current picture (S930). Here, the first information and the second information are information included in the picture header of the image information, and may correspond to the aforementioned intra_signalling_present_flag, inter_signalling_present_flag, slice_type_idc, mixed_slice_signalling_present_flag, intra_slice_only_flag, IntraSignallingPresentFlag and/or InterSignallingFlag.

As an example, in case that the information necessary for the inter prediction operation for the decoding process is included in the picture header related to the current picture as the inter-coded slice is included in the current picture, the entropy encoder 240 of the encoding apparatus may determine the value of the first information as 1. Further, in case that the information necessary for the intra prediction operation for the decoding process is included in the corresponding picture header as the intra-coded slice is included in the current picture, the entropy encoder 240 of the encoding apparatus may determine the value of the second information as 1. In this case, the first information may correspond to the inter_signaling_present_flag, and the second information may correspond to the intra_signaling_present_flag. The first information may be called a first flag, information on whether syntax elements being used for inter slices are present in the picture header, a flag for whether syntax elements being used for the inter slices are present in the picture header, information on whether slices in the current picture are inter slices, or a flag for whether the slices are inter slices. The second information may be called a second flag, information on whether syntax elements being used for intra slices are present in the picture header, a flag for whether syntax elements being used for the intra slices are present in the picture header, information on whether slices in the current picture are intra slices, or a flag for whether the slices are intra slices.

Meanwhile, in case that only the information necessary for the intra prediction operation is included in the corresponding picture header as only the intra-coded slice is included in the picture, the entropy encoder 240 of the encoding apparatus may determine the value of the first information as 0, and may determine the value of the second information as 1. Further, in case that only the information necessary for the inter prediction operation is included in the corresponding picture header as only the inter-coded slice is included in the picture, the value of the first information may be determined as 1, and the value of the second information may be determined as 0. Accordingly, if the value of the first information is 0, all slices in the current picture may have I slice type. If the value of the second information is 0, all the slices in the current picture may have the P slice type or the B slice type. Here, the information necessary for the intra prediction operation may include the syntax element being used for decoding of the intra slice, and the information necessary for the inter prediction operation may include the syntax element being used for decoding of the inter slice.

As another example, if all the slices in the current picture have the I slice type, the entropy encoder 240 of the encoding apparatus may determine the value of the information about the slice type as 0, and if all the slices in the current picture have the P slice type or the B slice type, the entropy encoder 240 of the encoding apparatus may determine the value of the information about the slice type as 1. If all the slices in the current picture have I slice type, P slice type, and/or B slice type (i.e., the slice types of the slices in the picture are mixed), the entropy encoder 240 of the encoding apparatus may determine the value of the information about the slice type as 2. In this case, the information about the slice type may correspond to the slice_type_idc.

As still another example, if all the slices in the current picture have the same slice type, the entropy encoder 240 of the encoding apparatus may determine the value of the information about the slice type as 0, and if the slices in the current picture have different slice types, the entropy encoder 240 of the encoding apparatus may determine the value of the information about the slice type as 1. In this case, the information about the slice type may correspond to the mixed_slice_signaling_present_flag.

If the value of the information about the slice type is determined as 0, information on whether the intra slice is included in the slices may be included in the corresponding picture header. The information on whether the intra slice is included in the slices may correspond to the intra_slice_only_flag. If all the slices in the picture have the I slice type, the entropy encoder 240 of the encoding apparatus may determine the value of the information on whether the intra slice is included in the slices as 1, determine the value of the information on whether the syntax elements being used for the intra slice are present in the picture header as 1, and determine the value of the information on whether the syntax elements being used for the inter slice is present in the picture header as 0. If the slice type of all the slices in the picture is the P slice and/or B slice type, the entropy encoder 240 of the encoding apparatus may determine the value of the information on whether the intra slice is included in the slices as 0, determine the value of the information on whether the syntax elements being used for the intra slice are present in the picture header as 0, and determine the value of the information on whether the syntax elements being used for the inter slice is present in the picture header as 1.

The entropy encoder 240 of the encoding apparatus may encode image information including the above-described first information, second information, and slice type information along with residual information and prediction-related information (S940). For example, the image information may include partitioning-related information, information about prediction mode, residual information, in-loop filtering-related information, first information, second information, slice type information, and the like, and include various syntax elements related to them. In an example, the image information may include information on various parameter sets such as an adaptation parameter set (APS), a picture parameter set (PPS), a sequence parameter set (SPS), a video parameter set (VPS) or the like. In addition, the image information may include various informations such as picture header syntax, picture header structure syntax, slice header syntax, coding unit syntax, and the like. The above-described first information, second information, information about slice type, information necessary for the intra prediction operation, and information necessary for the inter prediction operation may be included in the syntax in the picture header.

Information encoded by the entropy encoder 240 of the encoding apparatus may be output in the form of a bitstream. The bitstream may be transmitted to the decoding apparatus through a network or a storage medium.

Figure 11:
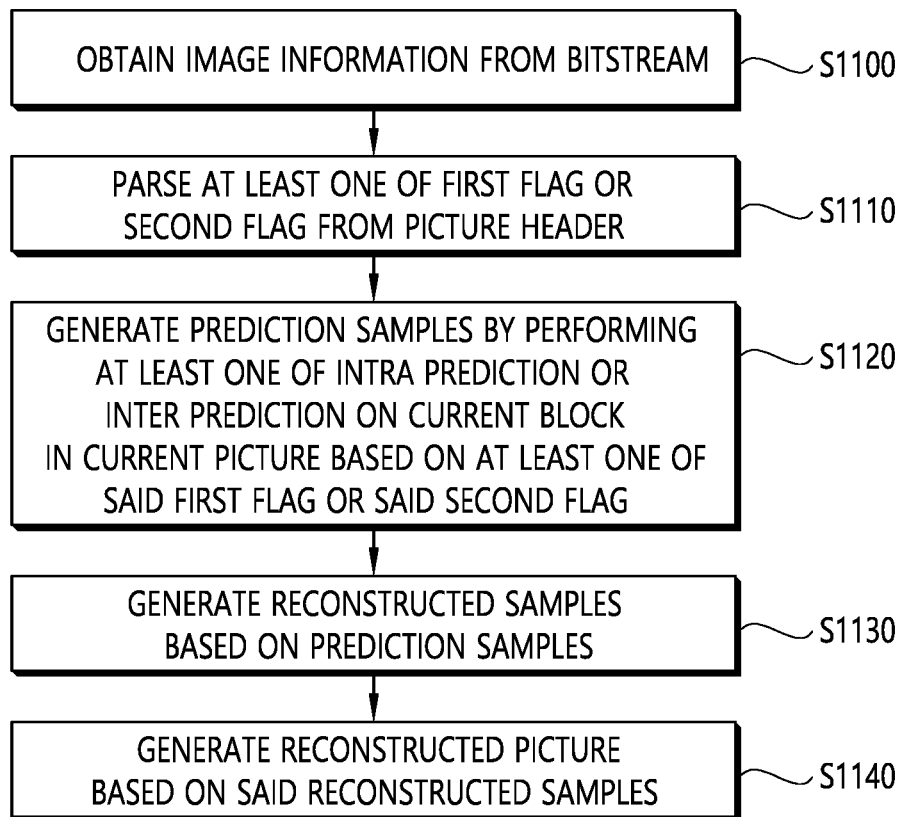
FIGS. 11 and 12 schematically represent an example of a video/image decoding method and associated components according to the embodiments of this document.
Figure 12:
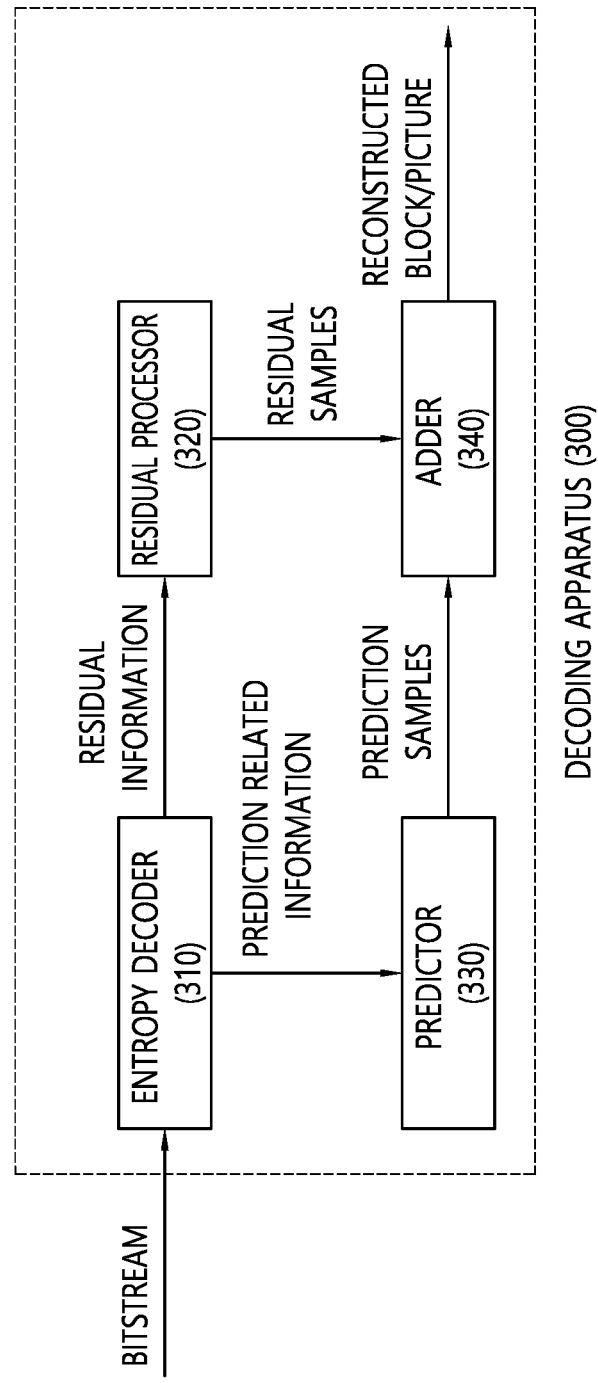

FIGS. 11 and 12 schematically represent an example of a video/image decoding method and associated components according to the embodiments of this document.

The video/image decoding method disclosed in FIG. 11 may be performed by the (video/image) decoding apparatus 300 disclosed in FIGS. 3 and 12. Specifically, for example, S1100 and S1120 of FIG. 11 may be performed in the entropy decoder 310 of the decoding apparatus, and S1130 may be performed in the predictor 330 of the decoding apparatus 300. S1130 and S1140 may be performed by the adder 340 of the decoding apparatus 300. The video/image decoding method disclosed in FIG. 11 may include the embodiments described above in this document.

Referring to FIGS. 11 and 12, the entropy decoder 310 of the decoding apparatus may obtain image information from a bitstream (S1100). The image information may include a picture header associated with the current picture. The current picture may include a plurality of slices.

Meanwhile, the entropy decoder 310 of the decoding apparatus may parse from the picture header at least one of the first flag indicating whether information necessary for an inter prediction operation for a decoding process is present in a picture header associated with the current picture, or the second flag indicating whether information necessary for an intra prediction operation for the decoding process are present in a picture header associated with the current picture (S1110). Here, the first flag and the second flag may correspond to the aforementioned intra_signalling_ present_flag, inter_signalling_present_flag, slice_type_idc, mixed_slice_signalling_present_flag, intra_slice_only_flag, IntraSignallingPresentFlag and/or InterSignallingPresentFlag. The entropy decoder 310 of the decoding apparatus may parse the syntax elements included in the picture header of the image information based on the picture header syntax of any one of Tables 2, 4, and 6 described above.

The decoding apparatus may generate prediction samples by performing at least one of intra prediction and inter prediction on the current block in the current picture based on the first flag, the second flag, and information about the slice type (S1120).

Specifically, the entropy decoder 310 of the decoding apparatus may parse (or obtain) at least one of the information necessary for the intra prediction operation and or the information necessary for the inter prediction operation for the decoding process from the picture header related to the current picture based on the first flag, the second flag, and/or the information about the slice type. The predictor 330 of the decoding apparatus may generate prediction samples by performing intra prediction and/or inter prediction based on at least one of the information necessary for the intra prediction operation or the information for the inter prediction. Here, the information necessary for the intra prediction operation may include a syntax element being used for decoding of an intra slice, and the information necessary for the inter prediction operation may include a syntax element being used for decoding of an inter slice.

As an example, if the value of the first flag is 0, the entropy decoder 310 of the decoding apparatus may determine (or decide) that the syntax elements being used for the inter prediction are not present in the picture header, and may parse only the information necessary for the intra prediction operation from the picture header. If the value of the first flag is 1, the entropy decoder 310 of the decoding apparatus may determine (or decide) that the syntax elements being used for the inter prediction are present in the picture header, and may parse the information necessary for the inter prediction operation from the picture header. In this case, the first flag may correspond to the inter_signaling_present_flag.

Further, if the value of the second flag is 0, the entropy decoder 310 of the decoding apparatus may determine (or decide) that the syntax elements being used for the intra prediction are not present in the picture header, and may parse only the information necessary for the inter prediction operation from the picture header. If the value of the second flag is 1, the entropy decoder 310 of the decoding apparatus may determine (or decide) that the syntax elements being used for the intra prediction are present in the picture header, and may parse the information necessary for the intra prediction operation from the picture header. In this case, the second flag may correspond to the intra_signaling_present_flag.

If the value of the first flag is 0, the decoding apparatus may determine that all slices in the current picture have the type of I slice. If the value of the first flag is 1, the decoding apparatus may determine that 0 or more slices in the current picture have the type of P slice or B slice. In other words, if the value of the first flag is 1, the slice having the type of P slice or B slice may be included or may not be included in the current picture.

Further, if the value of the second flag is 0, the decoding apparatus may determine that all slices in the current picture have the type of P slice or B slice. If the value of the second flag is 1, the decoding apparatus may determine that 0 or more slices in the current picture have the type of I slice. In other words, if the value of the second flag is 1, the slice having the type of I slice may be included or may not be included in the current picture.

As another example, if the value of the information about the slice type is 0, the entropy decoder 310 of the decoding apparatus may determine that all slices in the current picture have I slice type, and may parse only the information necessary for the intra prediction operation. If the information about the slice type is 1, the entropy decoder 310 of the decoding apparatus may determine that all slices in the corresponding picture have the P slice type or the B slice type, and may parse only the information necessary for the inter prediction operation from the picture header. If the value of the information for the slice type is 2, the entropy decoder 310 of the decoding apparatus may determine that the slices in the corresponding picture have the slice type in which the I slice type, the P slice type, and/or the B slice type are mixed, and may parse all of the information necessary for the inter prediction operation and the information necessary for the intra prediction operation from the picture header. In this case, the information about the slice type may correspond to the slice type idc.

As still another example, the entropy decoder 310 of the decoding apparatus may determine that all slices in the current picture have the same slice type if the value of the information about the slice type is determined as 0, and may determine that slices in the current picture have different slice types if the value of the information about the slice type is determined as 1. In this case, the information about the slice type may correspond to the mixed slice signalling present flag.

If the value of the information about the slice type is determined as 0, the entropy decoder 310 of the decoding apparatus may parse information on whether the intra slice is included in the slices from the picture header. The information on whether the intra slice is included in the slices may correspond to the intra_slice_only_flag as described above. If the information on whether the intra slice is included in the slices is 1, all the slices in the picture may have I slice type.

If the value of the information on whether the intra slice is included in the slices is 1, the entropy decoder 310 of the encoding apparatus may parse only the information necessary for the intra prediction operation from the picture header. If the value of the information on whether the intra slice is included in the slices is 0, the entropy decoder 310 of the decoding apparatus may parse only the information necessary for the inter prediction operation from the picture header.

If the value of the information about the slice type is 1, the entropy decoder 310 of the decoding apparatus may parse all of the information necessary for the inter prediction operation and the information necessary for the intra prediction operation from the picture header.

Meanwhile, the residual processor 320 of the decoding apparatus may generate residual samples based on the residual information obtained by the entropy decoder 310.

The adder 340 of the decoding apparatus may generate reconstructed samples based on the prediction samples generated by the predictor 330 and the residual samples generated by the residual processor 320 (S1130). In addition, the adder 340 of the decoding apparatus may generate a reconstructed picture (reconstructed block) based on the reconstructed samples (S1140).

After this, an in-loop filtering procedure such as an ALF procedure, SAO and/or deblocking filtering may be applied as needed to the reconstructed picture in order to improve subjective/objective video quality.

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present disclosure is applied may be produced in the form of a program executed by a computer and may be stored in a computer-readable recording medium. Multimedia data having a data structure according to the embodiment(s) of the present disclosure may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present disclosure may be embodied as a computer program product based on a program code, and the program code may be executed on a computer according to the embodiment(s) of the present disclosure. The program code may be stored on a computer-readable carrier.

Figure 13:
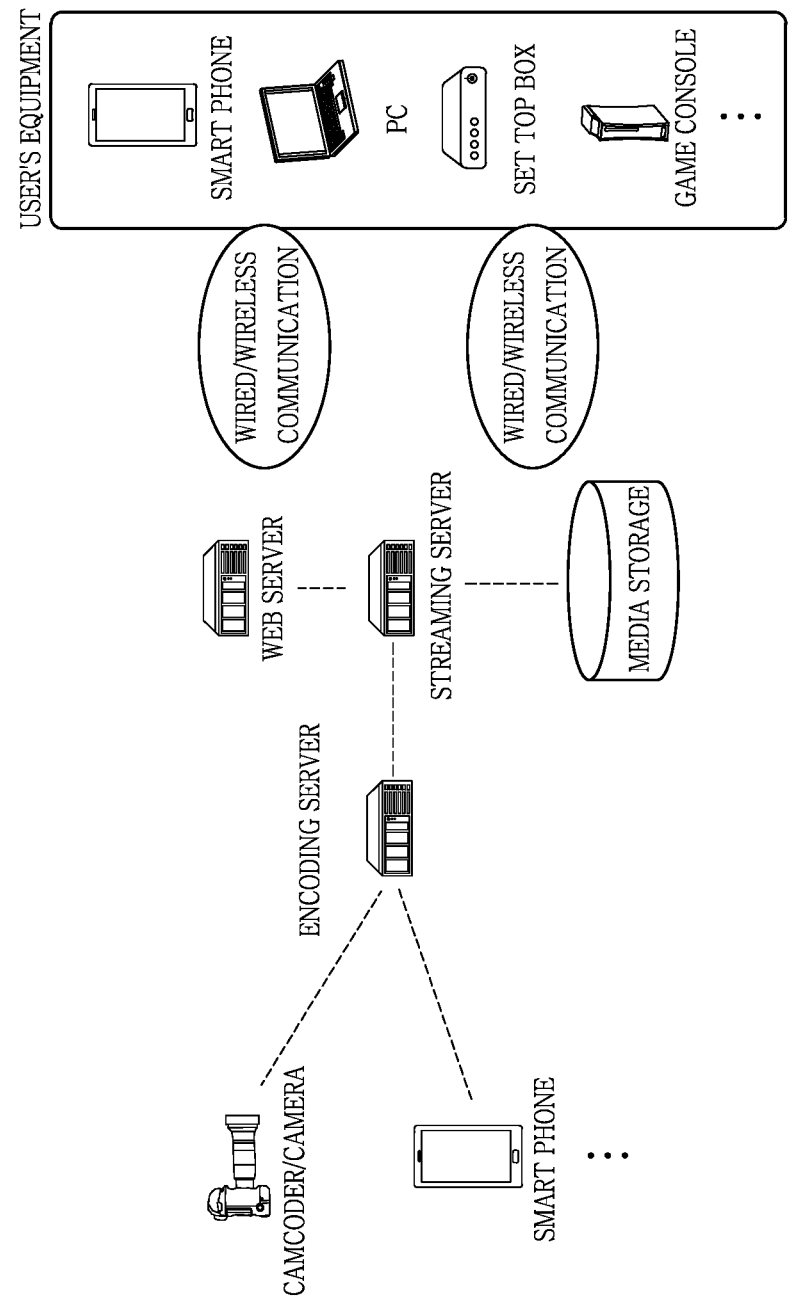
FIG. 13 represents an example of a content streaming system to which embodiments disclosed in this document can be applied.

FIG. 13 represents an example of a contents streaming system to which the embodiment of the present disclosure may be applied.

Referring to FIG. 13, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A decoding apparatus for an image decoding, the decoding apparatus comprising:
a memory; and
at least one processor connected to the memory, the at least one processor configured to:
receive a bitstream including image information, wherein the image information includes a picture header associated with a current picture, and a plurality of slices are included in the current picture;
parse, from the picture header, a syntax element specifying whether all the slices in the current picture are I slices;
derive prediction samples by performing at least one of intra prediction or inter prediction on blocks in the slices in the current picture based on the syntax element specifying whether all the slices in the current picture are the I slices; and
generate reconstructed samples based on the derived prediction samples,
wherein based on the syntax element specifying that one or more of the slices in the current picture are a P slice or B slice, information for an inter slice including a syntax element representing a maximum hierarchy depth for a coding unit resulting from multi-type tree splitting in the inter slice in the current picture is comprised in the picture header, and
wherein based on the syntax element specifying that all the slices in the current picture are the I slices, information for an intra slice including a syntax element representing a maximum hierarchy depth for a coding unit resulting from multi-type tree splitting in the intra slice in the current picture and a syntax element representing a difference between base 2 logarithm of a minimum size resulting from quad-tree splitting and base 2 logarithm of a minimum coding block size in the intra slice in the current picture is comprised in the picture header.

2. An encoding apparatus for an image encoding, the encoding apparatus comprising:
a memory; and
at least one processor connected to the memory, the at least one processor configured to:
determine types of slices in a current picture, wherein the slices are included in the current picture;
generate a syntax element specifying whether all the slices in the current picture are I slices; and
encode image information, wherein the image information includes the syntax element specifying whether all the slices in the current picture are the I slices,
wherein based on the syntax element specifying that one or more of the slices in the current picture are a P slice or B slice, information for an inter slice including a syntax element representing a maximum hierarchy depth for a coding unit resulting from multi-type tree splitting in the inter slice in the current picture is comprised in a picture header, and
wherein based on the syntax element specifying that all the slices in the current picture are the I slices, information for an intra slice including a syntax element representing a maximum hierarchy depth for a coding unit resulting from multi-type tree splitting in the intra slice in the current picture and a syntax element representing a difference between base 2 logarithm of a minimum size resulting from quad-tree splitting and base 2 logarithm of a minimum coding block size in the intra slice in the current picture is comprised in the picture header.

3. An apparatus for transmitting data for image, the apparatus comprising:
at least one processor configured to generate a bitstream for the image, wherein the bitstream is generated based on determining types of slices in a current picture, wherein the slices are included in the current picture, generating a syntax element specifying whether all the slices in the current picture are I slices, and encoding image information, wherein the image information includes the syntax element specifying whether all the slices in the current picture are the I slices,
wherein based on the syntax element specifying that one or more of the slices in the current picture are a P slice or B slice, information for an inter slice including a syntax element representing a maximum hierarchy depth for a coding unit resulting from multi-type tree splitting in the inter slice in the current picture is comprised in a picture header, and
wherein based on the syntax element specifying that all the slices in the current picture are the I slices, information for an intra slice including a syntax element representing a maximum hierarchy depth for a coding unit resulting from multi-type tree splitting in the intra slice in the current picture and a syntax element representing a difference between base 2 logarithm of a minimum size resulting from quad-tree splitting and base 2 logarithm of a minimum coding block size in the intra slice in the current picture is comprised in the picture header; and
a transmitter configured to transmit the data comprising the bitstream.

* * * * *